(12) United States Patent
Ibamoto et al.

(10) Patent No.: US 7,476,176 B2
(45) Date of Patent: Jan. 13, 2009

(54) AUTOMATIC TRANSMISSION, DYNAMO-ELECTRIC MACHINE, AND CAR

(75) Inventors: Masahiko Ibamoto, Tokyo (JP); Hiroshi Kuroiwa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/490,014

(22) Filed: Jul. 21, 2006

(65) Prior Publication Data

US 2006/0258506 A1     Nov. 16, 2006

Related U.S. Application Data

(63) Continuation of application No. 10/997,990, filed on Nov. 29, 2004, now Pat. No. 7,093,512, which is a continuation of application No. 10/221,134, filed as application No. PCT/JP01/01849 on Mar. 9, 2001, now Pat. No. 6,941,830.

(30) Foreign Application Priority Data

Mar. 10, 2000    (JP)  ............... 2000-072447
Sep. 19, 2000    (JP)  ............... 2000-288881

(51) Int. Cl.
*H02P 17/00* (2006.01)
(52) U.S. Cl. .................. 477/15; 903/930
(58) Field of Classification Search .......... 477/3, 477/5, 6, 8, 15; 903/930, 942, 946
See application file for complete search history.

(56) References Cited

U.S. PATENT DOCUMENTS

| | | | |
|---|---|---|---|
| 4,335,429 A | 6/1982 | Kawakatsu | |
| 5,031,479 A | 7/1991 | Ibamoto et al. | |
| 5,123,302 A | 6/1992 | Brown et al. | |
| 5,303,794 A | 4/1994 | Hrovat et al. | |
| 5,644,200 A | 7/1997 | Yang | |
| 5,720,203 A | 2/1998 | Honda et al. | |
| 5,890,392 A | 4/1999 | Ludanek et al. | |
| 5,915,512 A | 6/1999 | Adamis et al. | |
| 5,950,781 A | 9/1999 | Adamis et al. | |
| 6,159,127 A | 12/2000 | Loeffler et al. | |

(Continued)

FOREIGN PATENT DOCUMENTS

DE     43 16 784 A1     11/1994

(Continued)

OTHER PUBLICATIONS

Japanese Office Action dated Jul. 3, 2007 (Three (3) pages).

*Primary Examiner*—Tisha D Lewis
(74) *Attorney, Agent, or Firm*—Crowell & Moring LLP

(57) ABSTRACT

An automatic transmission, wherein an electric motor is between a couple of clutch shafts of twin-clutch type automatic transmission. The torque and speed of the electric motor establishes a smooth and efficient gear shifting control, and enables a creep control, idling stop starting control, R-to-D, and D-to-R selecting control. As the friction control of the clutch is not performed, smooth gear shift work can be realized. The same control scheme allows creep control, idling stop starting control, R-to-D, and D-to-R selecting control to be enabled, which leads to such an effect that the life is extended without the clutch being worn away.

4 Claims, 20 Drawing Sheets

U.S. PATENT DOCUMENTS

| | | |
|---|---|---|
| 6,341,541 B1 | 1/2002 | Sakamoto et al. |
| 6,427,547 B1 | 8/2002 | Bowen |
| 6,427,549 B1 * | 8/2002 | Bowen .................. 74/331 |
| 6,499,370 B2 | 12/2002 | Bowen |
| 6,502,474 B2 | 1/2003 | Sakamoto et al. |
| 6,634,247 B2 | 10/2003 | Pels et al. |
| 6,645,105 B2 | 11/2003 | Kima |
| 6,712,734 B1 * | 3/2004 | Loeffler .................. 477/5 |
| 2002/0177504 A1 | 11/2002 | Pels et al. |
| 2003/0074992 A1 | 4/2003 | Gierling et al. |

FOREIGN PATENT DOCUMENTS

| | | |
|---|---|---|
| DE | 196 31 983 C1 | 2/1998 |
| DE | 197 11 820 A1 | 9/1998 |
| DE | 198 50 549 A1 | 5/2000 |
| EP | 0 756 107 A2 | 1/1997 |
| EP | 0 825 058 A2 | 2/1998 |
| EP | 0 827 861 A2 | 3/1998 |
| JP | 58-149444 A | 9/1983 |
| JP | 61-168350 U | 10/1986 |
| JP | 62-204036 A | 9/1987 |
| JP | 4-175565 A | 6/1992 |
| JP | 4-203669 A | 7/1992 |
| JP | 5-240073 A | 9/1993 |
| JP | 6-317242 A | 11/1994 |
| JP | 9-42387 A | 2/1997 |
| JP | 10-89456 A | 4/1998 |
| JP | 10-89457 A | 4/1998 |
| JP | 11-275711 A | 10/1999 |
| WO | WO0026559 A1 * | 5/2000 |

* cited by examiner

AUTOMATIC TRANSMISSION, DYNAMO-ELECTRIC MACHINE, AND CAR

CROSS REFERENCE TO RELATED APPLICATIONS

This application is a continuation of U.S. patent application Ser. No. 10/997,990, filed Nov. 29, 2004, now U.S. Pat. No. 7,093,512, which is a continuation of U.S. patent application Ser. No. 10/221,134, filed Sep. 10, 2002, now U.S. Pat. No. 6,941,830 which is a 371 of PCT/JP01/01849, filed Mar. 9, 2001, the entire disclosures of which are expressly incorporated by reference herein.

This application also claims the priority of Japanese Application 2000-72447, filed Mar. 10, 2000, and Japanese Application 2000-288881, filed Sep. 19, 2000.

TECHNICAL FIELD

The present invention relates to a automatic transmission for the automobile enabling the electric motor control and the regenerative braking, and its control method and an automobile using this transmission.

BACKGROUND ART

In general, automatic transmissions using a planetary gear or a transmission mechanism with parallel counter shaft are used in the conventional automatic transmissions, in which the clutches installed at the individual gear trains having their own different gear ratio are selectively engaged in order to shift gears. This prior art is disclosed, for example, in Japanese Patent Laid-Open Number 10-89456 (1998).

The result of analyzing the above prior art is described below. The analyzing result shown below is not a straight forward description of the prior art but shown as the analyzing result.

In case of shifting up gears, as the next-stage clutch is started to be engaged and the torque transmitting power is gradually made increase in a partial connecting condition, the torque transfer in the torque phase arises in which the transmitting torque of the pre-stage clutch gradually decreases. When the pre-stage clutch is released in synchronization with the timing when all the torque is transferred to the next-stage clutch, the rotating speed transmission in the inertia phase arises in which the engine speed decreases down to the input rotating speed of next-stage gear.

In case of shifting down gears, even if the transmitting torque of the next-stage clutch is made decrease, it is not principally possible to perform the torque transfer from the high gear position with a lower energy potential to the lower gear position with a high energy potential. For this reason, the rotating speed transfer is controlled at first in which the engine speed is made increase by making the pre-stage sliding, and then the torque transfer is controlled in which the clutch is made engaged in synchronized with the rotating speed of the next-stage clutch.

Thus, in the transmission control in the prior art, the torque transfer in the torque phase is managed by the friction control of the clutch, and the inertia energy is released in the inertia phase. However, in this method, there is such a disadvantageous aspect that the clutch plate is damaged due to its friction and thus its life time becomes inevitably short. In addition, according to this method, as the torque transmitting power is controlled by adjusting the friction force and the friction force has a negative resistance characteristics with respect to the relative speed, it is extremely difficult to control stably the torque transmitting power in a designated value, which leads to shift shock due to the generation of judder and even in the worst case, the clutch plate may be worn away with a rippled surface.

Especially in a shift down operation for accelerating the automobile by pressing the accelerator, as the torque transfer can not be realized in the beginning in principle, the rotating speed is controlled in advance and then the clutch is connected for the low speed gear before the torque transfer. For this reason, the response from pressing the accelerator to reaching a designated torque is so slow that the drivability is not good.

DISCLOSURE OF INVENTION

A first object of the present invention is to provide an automobile transmission control system enabling friction-free, smooth and high-response transmission control as well as electrically-driven running and regenerative braking in order to solve the above mentioned problems in the prior art.

A second object of the present invention is to reduce relatively the cost for the overall functions by enabling the creep control and the pull-out control with an identical means as well as the transmission control.

In the present invention, the first power transmitting channel for transmitting the power of the internal combustion engine to the traction shaft through the first open-close clutch and the first transmission mechanism; the second power transmitting channel for transmitting the power to the traction shaft through the second transmission mechanism having a transmission gear ratio different from the first transmission mechanism; the revolving shaft located near the traction shaft after said first open-close clutch on said first power transmit channel; and an electric motor composed of the rotor and the stator individually connected to the revolving shaft locate near the traction shaft after said second open-close clutch on said second power transmit channel are installed, in which smooth and high-response transmission control independent of friction control by the clutch is realized by means of the rotating speed control of the electric motor for establishing the rotating speed transfer in the inertia phase.

In addition, by making the best use of potential for controlling the torque of the traction shaft with the toque generated by the electric motor, the control for a extremely low-speed running, that is, a creep running without engine operation, saving the fuel by shutting off the engine while the automobile stops and then restarting the engine while the automobile runs again is realized, and the control for adjusting the torque continuously and smoothly when altering the forward movement and the backward movement is realized. This application is a continuation of PCT International Application No. PCT/EP2004/000187, filed on Jan. 14, 2004, the entire disclosure of which is expressly incorporated by reference herein.

Other objects, advantages and novel features of the present invention will become apparent from the following detailed description of the invention when considered in conjunction with the accompanying drawings.

BEST MODE FOR CARRYING OUT INVENTION

Figure 1:
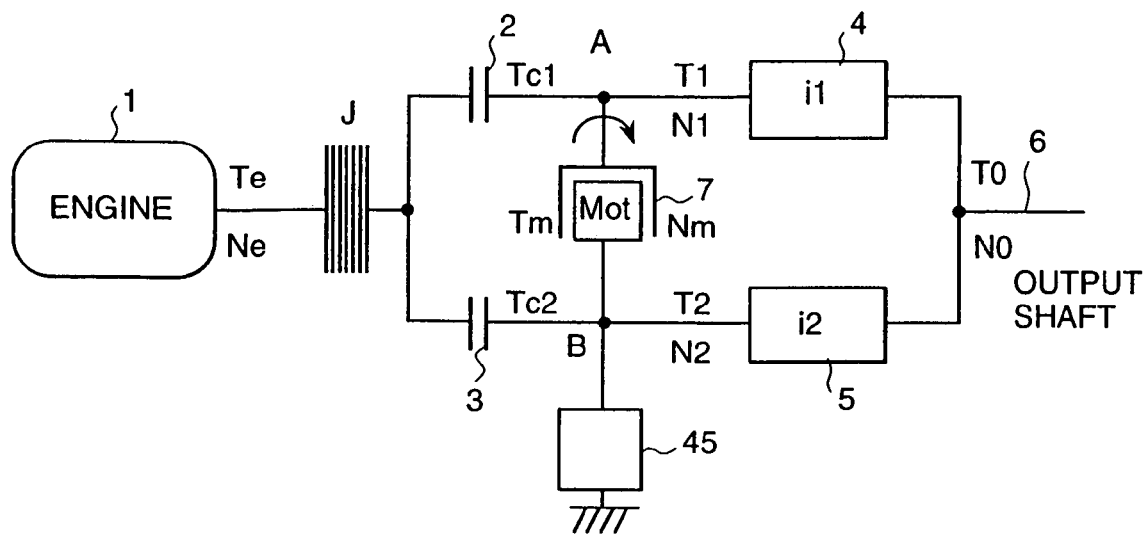
FIG. 1 is a block diagram illustrating the principal structure of the first embodiment of the present invention.

Structural Components and Control Method of the Structural Components in the First Structural Example The principle structure of the first embodiment of the present invention is shown in FIG. 1. The output of the engine 1 is connected to the individual gear trains 4 and 5 through a couple of clutches 2 and 3, and the output of the individual gear trains 4 and 5 is integrated into the single output shaft 6 in order to drive the traction wheel (not shown). The first gear train 4 connected at the point A to the first clutch 2 forms an odd-numbered gear, and the second gear train 5 connected at the point B to the second clutch 3 forms an even-numbered gear. The electric motor 7 connects between the points A and B for the individual gear trains and the individual clutches, and further, one side of the shaft of the electric motor 7 is fixed specifically. In this embodiment, the bake 45 is placed between the electric motor shaft connected to the second clutch 3 and the transmission housing 23.

At first, the operation principle is described. In the drawing of the principle structure, in case that the automobile is running while the first clutch 2 is engaged and the second clutch 3 is released, assuming that the vector from the point B to the point A represents the positive direction, the torque of the electric motor 7 satisfies the following equations;

$$T0 = i1 \times T1 + i2 \times T2 \qquad \text{[Formula 1]}$$

$$T2 = -Tm \qquad \text{[Formula 2]}$$

$$T1 = Te + Tm \qquad \text{[Formula 3]}$$

The following expression can be derived for the torque of the output shaft.

$$T0 = i1Te + (i1 - i2)Tm \qquad \text{[Formula 4]}$$

In case that the first clutch 2 is released and the second clutch 3 is engaged, the following contractive equations are derived, $$T0 = i1 \times T1 + i2 \times T2 \qquad \text{[Formula 5]}$$

$$T1 = Tm \qquad \text{[Formula 6]}$$

$$T2 = Te - Tm \qquad \text{[Formula 7]}$$

and then, the following expression can be derived for the torque of the output shaft.

$$T0 = i2Te + (i1 - i2)Tm \qquad \text{[Formula 8]}$$

This means that, in addition to the torque used for driving the output shaft through the gears directly connected to the engine, the torque equivalent to the multiplication of the motor torque and the difference in the gear ratio is applied to the output shaft. As the motor torque can be controlled intentionally so as to be positive or negative, the gear ratio may be selected purposely with the gears disconnected from the engine and then the polarity and intensity of the motor torque may be controlled purposely.

Figure 2:
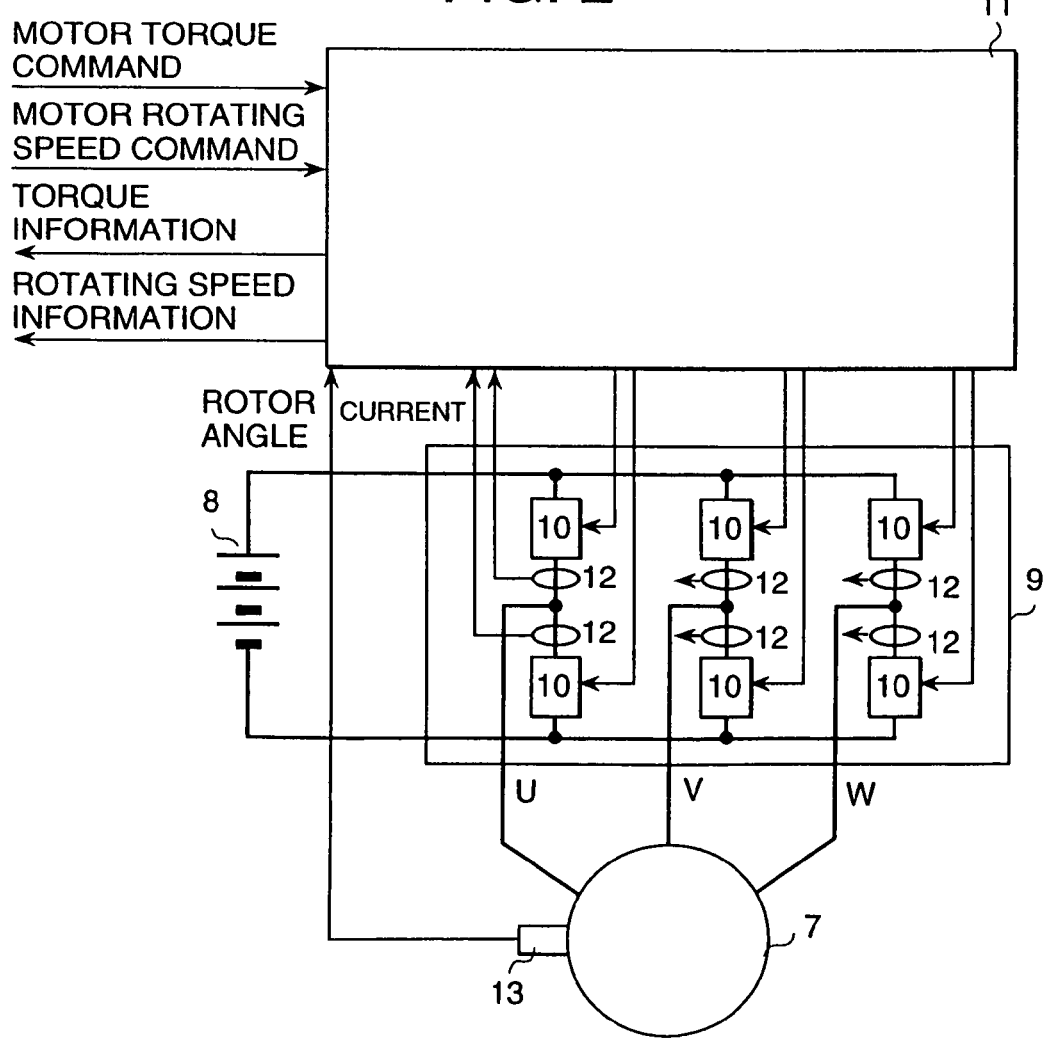
FIG. 2 is a block diagram illustrating the structure of the electric motor control used in the embodiment of the present invention.

The electric motor control system used in the first embodiment of the present invention is shown in FIG. 2. For example, in case that the electric motor 7 is an permanent magnet synchronous motor, 3-phase alternating currents U, V and W are supplied by the inverter 9 connected to the battery 8. The high-speed switching devices 10 are placed at the arms of the inverter 9 for the individual phases. The gate control signals of those high-speed switching devices 10 are controlled by the electric motor control electronics 11. The electric motor control electronics 11 receives the torque reference and the motor speed reference as well as feedbacks the output from the current sensors 12 of the individual arms and the output from the rotor position sensor 13 for sensing the rotor angle in order to control the torque and speed of the electric motor 7 so as to be adapted to the reference values. As this kind of control scheme is well known in the field of Power Electronics, its detail description is not mentioned here.

Thus, in responsive to the torque reference and the motor speed reference supplied to the electric motor control electronics 11, the torque and motor speed of the electric motor can be controlled as in full quadrant control. Only if the full quadrant control is established, it is allowed that the electric motor is not limited to the permanent magnet synchronous motor but may be an induction motor or a DC motor.

Figure 4:
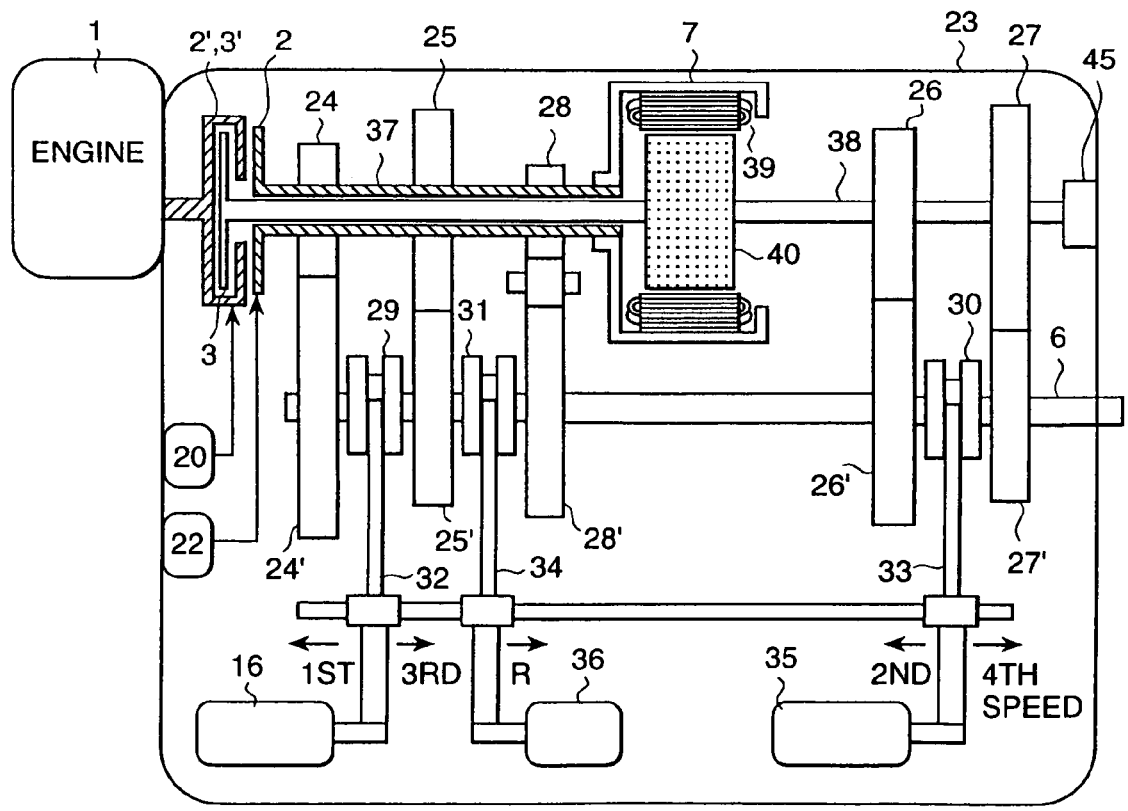
FIG. 4 is a structural drawing illustrating the structure of the transmission in the first embodiment of the present invention.

The structure of the transmission in the first embodiment of the present invention is shown in FIG. 4. The transmission housing 23 is connected to the engine 1, and the clutches 2 and 3 are mounted to the engine output shaft. The clutches form a so-called twin clutch, in which the clutches are arranged in a coaxial configuration so that the output of the first clutch 2 may be directed toward the outside shaft 37 and that the output of the second clutch 3 may be directed toward the inside shaft 38, and the friction plates 2' and 3' of both clutches at the engine side are formed as a single unit. The individual clutches 2 and 3 engaged with the applied pressure generated by the clutch actuators 20 and 22. The clutch actuators 20 and 22 may be selected from any type of actuators including hydraulic type, air-operated type and mechanical type.

The first speed gear 24, the third speed gear 25 and the reverse gear 28 are connected to the output shaft 37 of the first clutch 2, and the second speed gear 26 and the forth speed gear 28 are connected to the output shaft 38 of the second clutch 3. The driven gears 24' to 28' for the individual speed gears, each engaged to the gears 24 to 28, are arranged on the output shaft 6 so as to enable to rotate on the shaft and connected to the output shaft 6 through the dog clutches 29 to 31 having a synchronous mesh mechanism. The dog clutches 29 to 31 move to their own target gear by the shift fork 32 to 34 and are engaged to one another. The shift fork 32 to 34 are driven by the individual shift actuators 15, 35 and 36. In this embodiment, though an example using individually selected shift actuators is shown, it is allowed that the target shift forks may be moved by a single actuator selected purposely.

The structure of the above mentioned twin-clutch type automatic transmission is well known. Though it may be different in the gear arrangement and the position of the dog clutches, a similar structure is disclosed in Japanese Patent Laid-Open number 10-89456 (1998). This example illustrates such an example that the gear shift operation is performed by the friction control of the clutch.

The electric motor 7 is connected between the output shafts 37 and 38 of both clutches. For example, in the embodiment shown in FIG. 4, the stator 39 of the electric motor is mounted to the output shaft 37 of the first clutch, and the rotor 40 of the electric motor is mounted to the output shaft 38 of the second clutch. Owing to this configuration, the electric motor 7 is inserted between the point A and the point B shown in FIG. 1 without using any connecting gear, which can realize the most simple structure.

The present invention is characterized as that the brake 45 is placed between the output shaft 38 of the second clutch connected to the rotor 40 of the electric motor and the transmission housing 23, in which the operation of this brake fixes the position of the rotor 40 of the electric motor. The brake 45 is controlled so as to be engaged and released in responsive to the control scheme in the embodiment to be described later.

Figure 5:
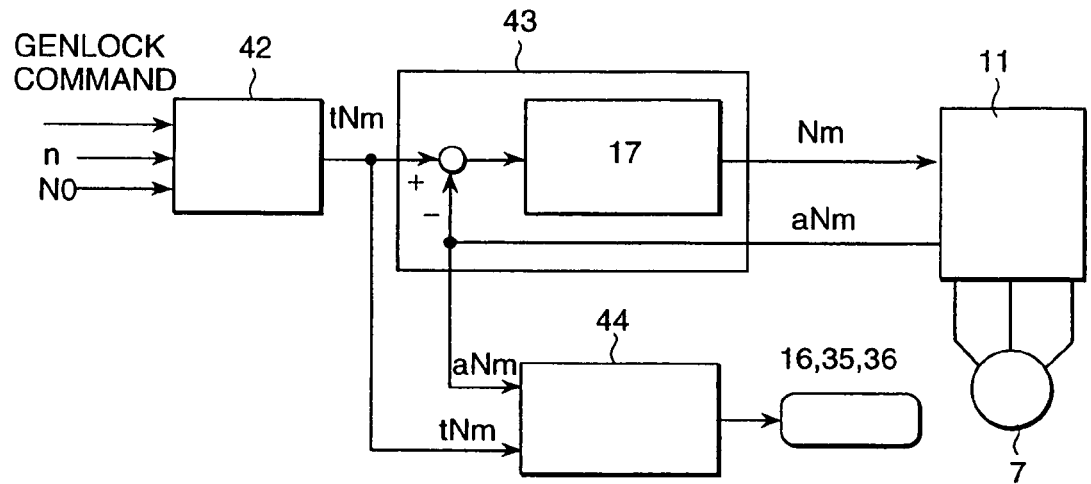
FIG. 5 is a block diagram illustrating the structure of the synchronized connecting control system used in the embodiment of the present invention.
Figure 6:
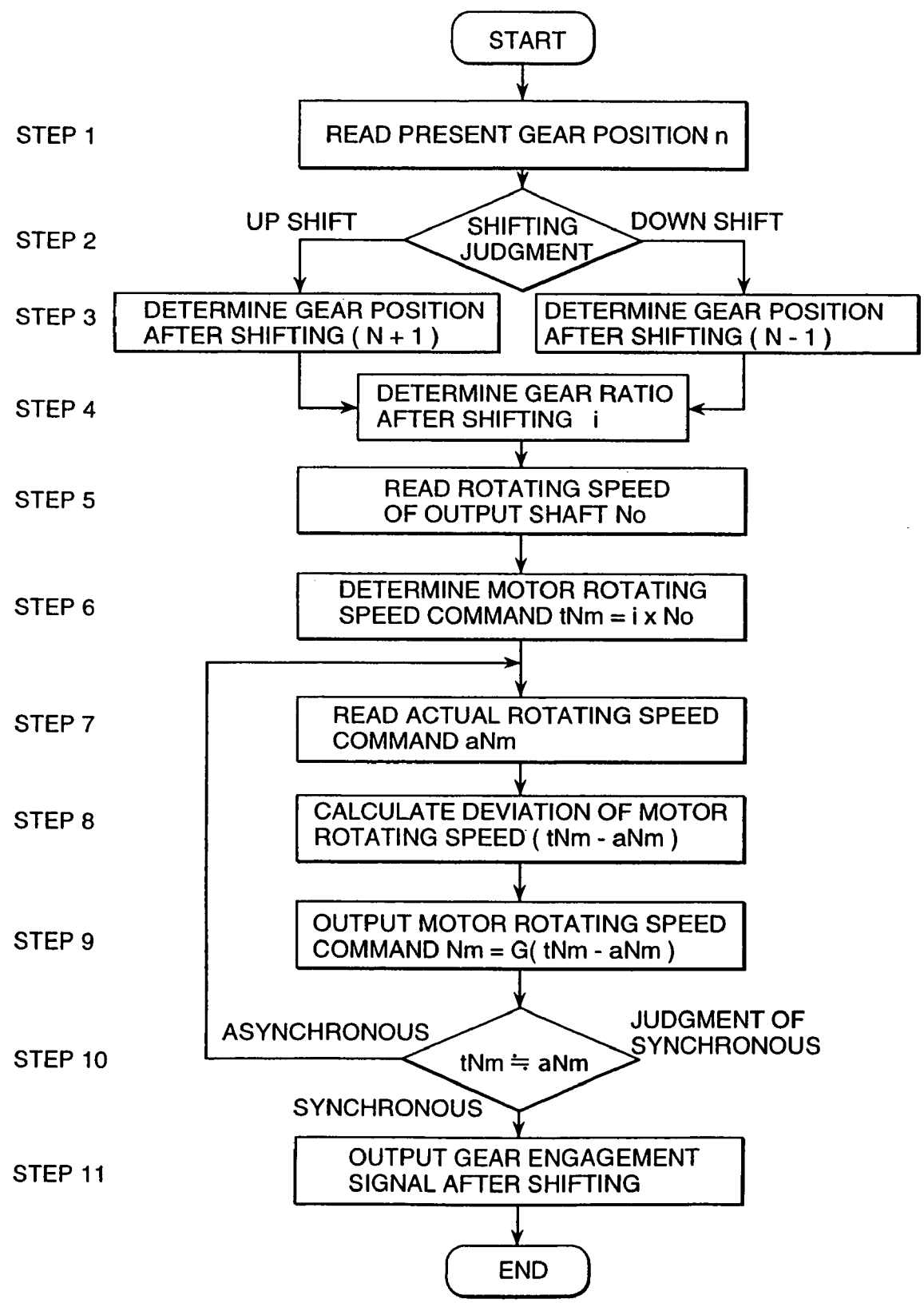
FIG. 6 is a flow chart illustrating the software configuration of the synchronized connecting control system shown in FIG. 5.

The transmission gear synchronized connecting control system used in the first embodiment of the present invention is shown in FIG. 5. FIG. 6 is a flow chart illustrating its operation. This operation is used for controlling the linkage of the dog clutch for the gear train connected to the disengaged clutch, and is at the preliminary step for shifting gears. In responsive to the synchronous linkage reference supplied to the motor speed reference generating part 42, this control operation is initiated. The present gear n is read in at Step 1, whether the gear is shifted up or down is judged at Step 2, and then the target gear is determined by the judgment result at Step 3. The target gear ratio is determined at Step 4, and then, in responsive to reading the motor speed No of the transmission output shaft 6 at Step 5, the motor speed reference tTm is calculated at Step 6.

In responsive to the calculated value for the motor speed reference tTm, in the motor speed feed back control part 43, the actual motor speed aNm obtained from the electric motor control electronics 11 is read in at Step 7, its deviation from the motor speed reference tTm is calculated at Step 8, the compensated value for the motor speed reference Nm is supplied by the motor speed instruction part 17 to the electric motor control electronics 11. Owing to this control scheme, the feed back control is established so that the actual motor speed aNm may be adjusted to be equal to the motor speed reference tTm.

At Step 10, the synchronous decision part 44 judges whether the actual motor speed aNm becomes nearly equal to the motor speed reference tTm, and if they are not synchronized to each other, this judgment is repeated until their synchronized state is established. Now that those values are synchronized to each other, at Step 11, the linkage signals are supplied the target shift actuator 16, 35 or 36 corresponding to the target next-stage gear determined at Step 3.

[Shift Control]

Figure 7:
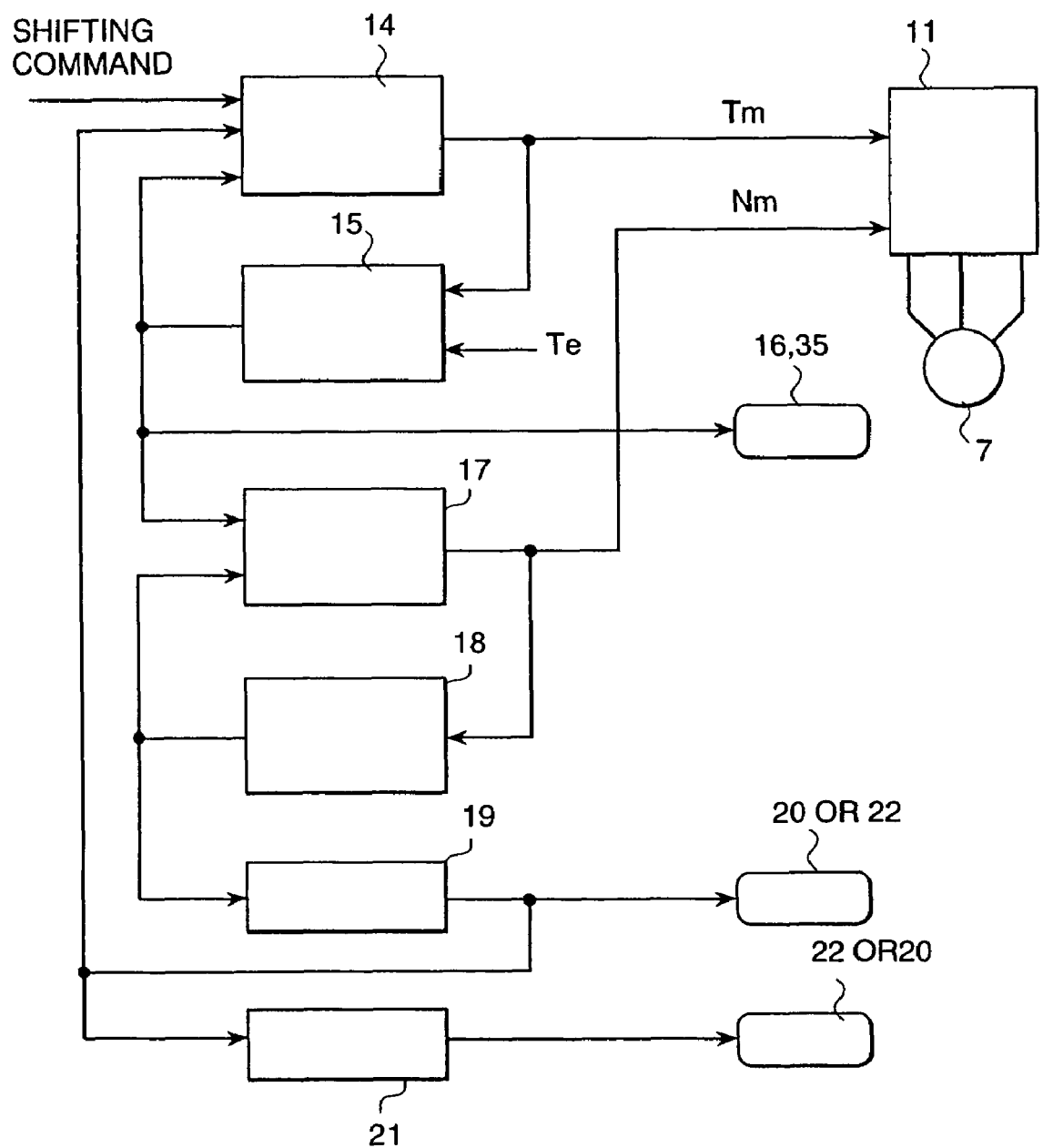
FIG. 7 is a block diagram illustrating the structure of the transmission control system in the second embodiment of the present invention.
Figure 8:
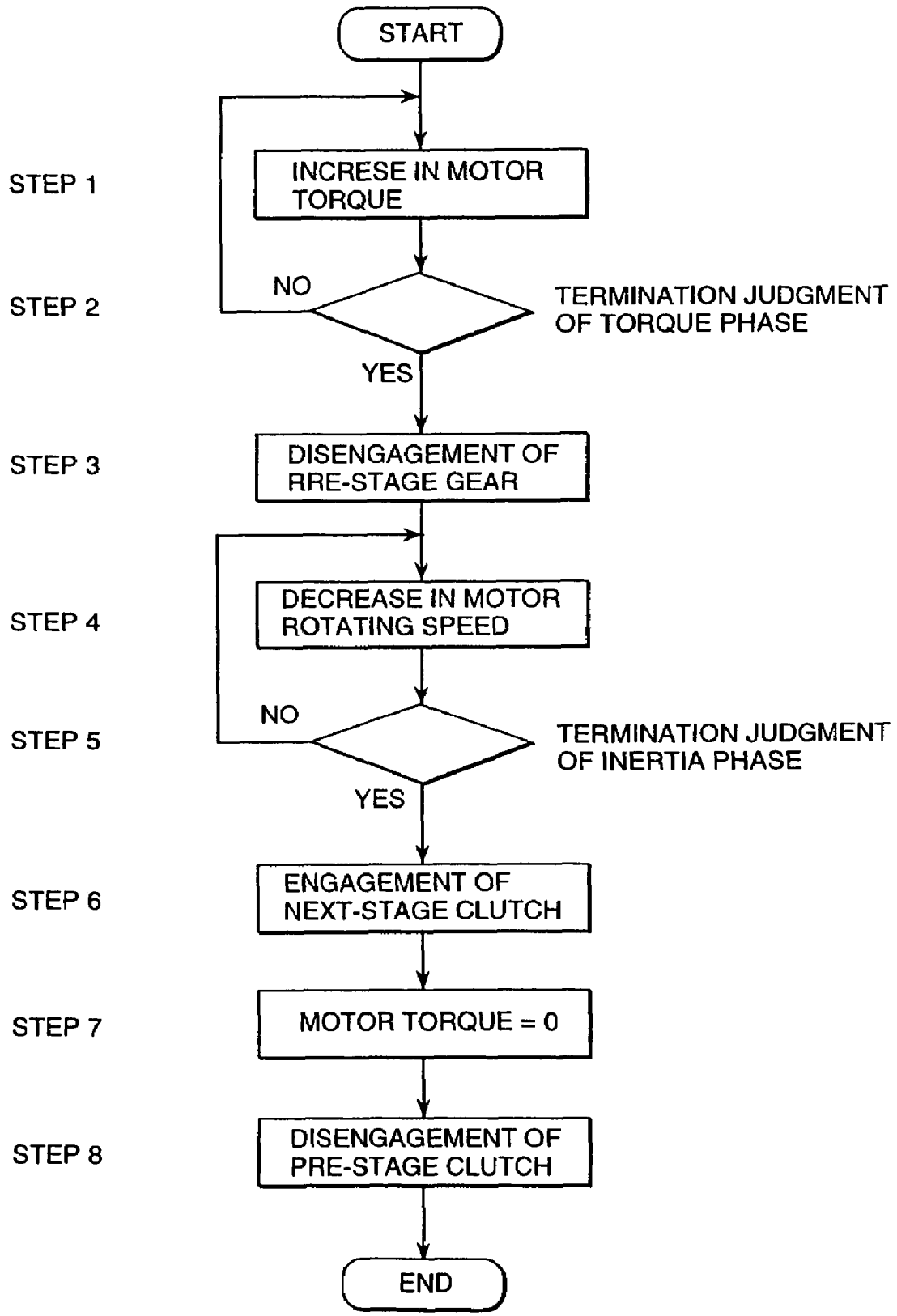
FIG. 8 is a flow chart illustrating the software configuration of the transmission control system shown in FIG. 7.
Figure 9:
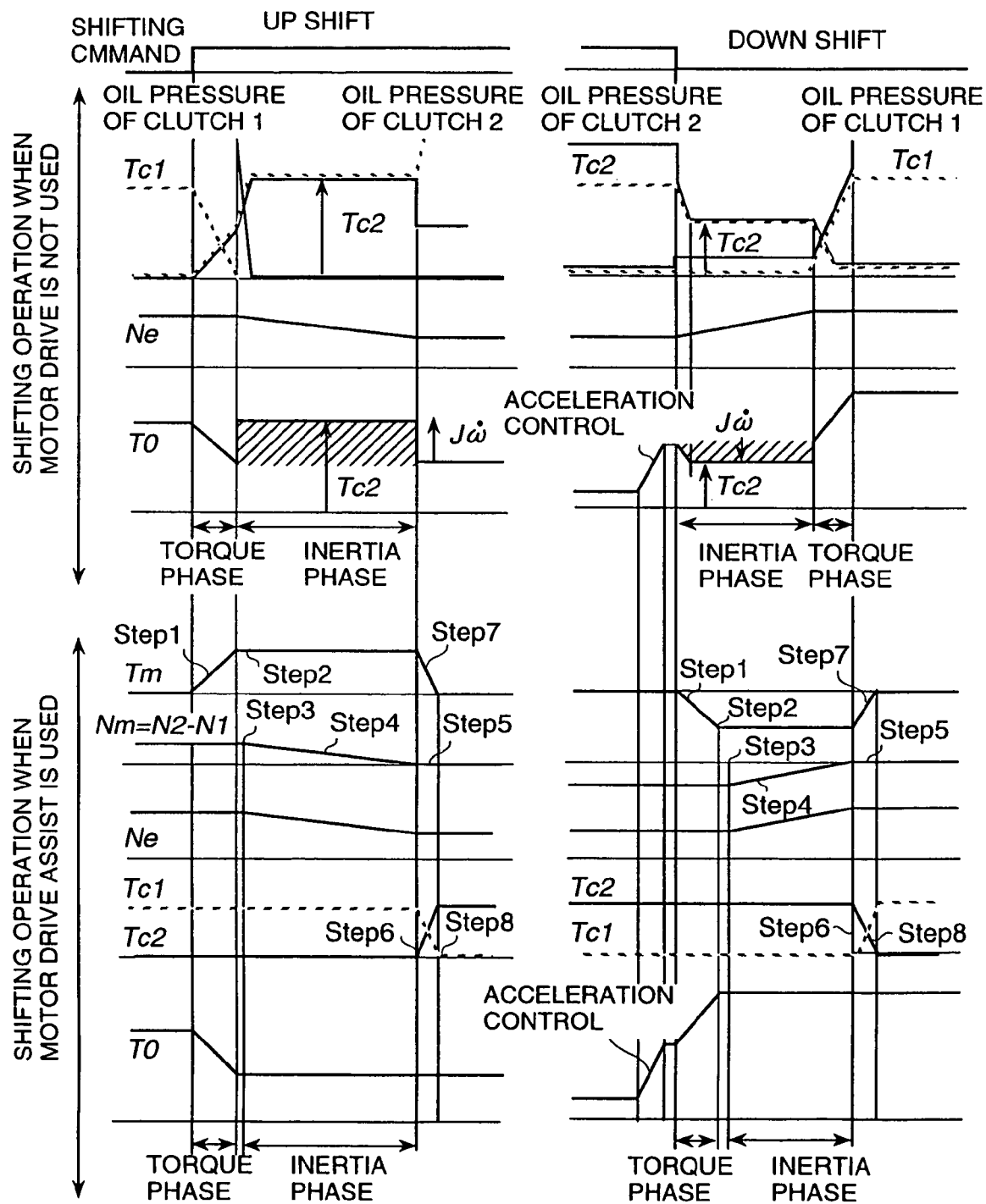
FIG. 9 is a time chart illustrating the changes in the torque and the rotating speed in the shift operation in the transmission control system shown in FIG. 7.

A block diagram for shift control in the second embodiment of the present invention is shown in FIG. 7 and its procedural flow chart is shown in FIG. 8. Its structural components and their control scheme are similar to the first embodiment. FIG. 9 illustrates the changes in the torque and the rotating speed when shifting gears in comparison with the conventional method. The control operation in this embodiment is performed while the brake 45 is released.

The operation of this embodiment is described by referring to FIGS. 7 to 9. Receiving the instruction for shifting gears, the motor torque is increased at a designated increasing rate by the motor torque instruction part 14 at Step 1, the input torque at the next-stage gear increases and the input torque at the pre-stage gear decreases. This is a torque transfer process called by torque phase. In case of 1-to-2 or 3-to-4 shifting up operation, if the motor torque is made increase in the negative direction, the input torque T2 of the gear 5 increases as defined by the equation (2), the input torque T1 of the gear 4 decreases as defined by the equation (3), and then such a condition that T1=0 and T2=Te is established when such a state that Tm=−Te is satisfied. As the input motor speed N1 of the gear 4 is higher, the operation point on the electric motor operation plane shown in FIG. 3 moves from the point A to the point B. In case of 2-to-3 shifting up operation, if the motor torque is made increase in the positive direction, the input torque T1 of the gear 4 increases as defined by the equation (6), the input torque T2 of the gear 5 decreases as defined by the equation (7), and then such a condition that T1=Te and T2=0 is established when such a state that Tm=Te is satisfied.

Figure 3:
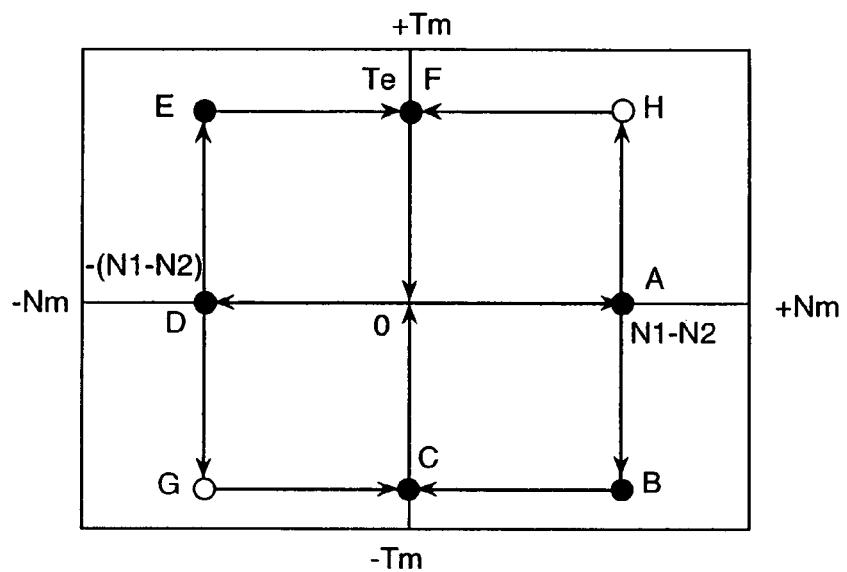
FIG. 3 is a characteristic curve of the electric motor illustrating the changes of the operating points of the electric motor in the electric motor control shown in FIG. 2.

As the input motor speed N2 of the gear 5 is higher, the operation point on the electric motor operation plane shown in FIG. 3 moves from the point D to the point E. In case of 4-to-3 or 2-to-1 shifting down operation, if the motor torque is made increase in the positive direction, the input torque T1 of the gear 4 increases as defined by the equation (6), the input torque T2 of the gear 5 decreases as defined by the equation (7), and then such a condition that T1=Te and T2=0 is established when such a state that Tm=Te is satisfied. As the input motor speed N1 of the gear 4 is higher, the operation point on the electric motor operation plane shown in FIG. 3 moves from the point A to the point H. In case of 3-to-2 shifting down operation, if the motor torque is made increase in the negative direction, the input torque T2 of the gear 5 increases as defined by the equation (2), the input torque T1 of the gear 4 decreases as defined by the equation (3), and then such a condition that T1=0 and T2=Te is established when such a state that Tm=−Te is satisfied. As the input motor speed of the gear 5 is higher, the operation point on the electric motor operation plane shown in FIG. 3 moves from the point D to the point G.

The torque phase termination decision part 15 judges whether the input torque of the pre-stage gear becomes 0. As there is often a case that the input torque of the pre-stage gear can not be detected directly, it is allowed to judge whether the operation point of the electric motor reaches the point B, the point E, the point H or the point G. This means that the judgment that the input torque of the pre-stage gear becomes 0 may be based on the fact, Tm=Te. In this case, it is required to detect or estimate the engine torque Te, and its scheme is disclosed, for example, in Japanese Patent Laid-Open Number 5-240073 (1993) and Japanese Patent Laid-Open Number 6-317242 (1994), both filed by the inventor of the present invention. The actual torque information aTm of the electric motor can be obtained by the electric motor control electronics 11 as shown in FIG. 2.

After terminating the torque phase at Step 2, the pre-stage gear is released by operating the shift actuator 16 or 35 of the pre-stage gear. Once the pre-stage gear is released, the engine speed can be made change.

As the motor speed instruction part 17 begins to reduce the motor speed at Step 4, the engine speed changes to the input speed of the next-stage gear. This step is a revolution speed transfer process called inertia phase. In case of 1-to-2 or 3-to-4 up-shifting operation, as the input motor speed of the gear 4 is made decrease while the input torque of the gear 5 is maintained to be made increase with respect to the input motor speed of the gear 4, the operation point on the electric motor operation plane shown in FIG. 3 moves from the point B to the point C. In case of 2-to-3 up-shifting operation, as the input motor speed of the gear 5 is made decrease while the input torque of the gear 4 is maintained to be made increase with respect to the input motor speed of the gear 5, the operation point on the electric motor operation plane shown in FIG. 3 moves from the point E to the point F. In case of 4-to-3 or 2-to-1 down-shifting operation, as the input motor speed of the gear 4 is made decrease while the input torque of the gear 4 is maintained to be made increase with respect to the input motor speed of the gear 5, the operation point on the electric motor operation plane shown in FIG. 3 moves from the point H to the point F. In case of 3-to-2 down-shifting operation, as the input motor speed of the gear 5 is made decrease while the input torque of the gear 4 is maintained to be made increase with respect to the input motor speed of the gear 5, the operation point on the electric motor operation plane shown in FIG. 3 moves from the point G to the point C.

The inertia phase termination decision part 18 judges the inertia phase termination condition by considering whether the engine speed is equal to the input speed of the next-stage gear, and in case that the input speed of the individual gear can not be detected directly, it is allowed to judge whether the motor speed Nm of the electric motor is 0. The motor speed information of the electric motor is obtained from the electric motor control electronics 11.

Now that the inertia phase termination condition is judged at Step 5, the next-stage clutch is made engaged with the clutch actuator 20 or 22 operated by the next-stage clutch control part 19 at Step 6. The motor torque instruction part 14 makes the motor torque 0 at Step 7 as well as the next-stage clutch control part 21 releases the next-stage clutch by operating the next-stage clutch actuator 22 or 20 at Step 8.

In case of shifting up, as the input speed of the next-stage gear is lower than the input speed of the pre-stage gear, which decreases the potential energy consequently, the inertia energy in the inertia phase is regenerated at the battery through the electric motor. In case of shifting down, as the input speed of the next-stage gear is higher than the input speed of the pre-stage gear, which increases the potential energy consequently, the inertia energy in the inertia phase is supplied from the battery through the electric motor.

FIG. 9 shows the torque and the motor speed of the individual part of the automatic transmission when shifting gears in the prior art for comparative study. The transmission in the prior art shifts up gears only by the friction control of the clutch which is a passive element, the up-shifting operation which reduces the potential energy can be supported but the shifting down operation which increases the potential energy can not be supported. Therefore, in order to solve this problem in the shirting down operation in the prior art, the motor speed transfer is performed at first by making the pre-stage clutch slide and then the torque transfer is performed by synchronizing the next-stage clutch. In this operation, the torque transfer may arise so rapidly that the shift shock, so-called "over shoot", which requires such a control solution that the engine torque is reduced in accordance with the torque transfer.

The gear-shift algorithm in the present invention, the identical control scheme may be applied to the up-shifting operation as well as the down-shifting operation in shifting the gears. As the torque transfer to the higher potential energy can be performed while the motor speed difference is maintained to be constant in the down-shifting operation by using an active element such as electric motor as in the present invention, the next-stage torque rises up promptly when the gear shift operation is initiate as well as the inertia torque does not take effect, which leads to higher torque response and excellent drivability.

In addition, in the shift control scheme of the present invention, the rate of change in the torque transfer, which is equivalent to the rate of change in the motor torque, can be controlled freely, and therefore, for example, in case of shifting down the gears on the corner of the road with low □ value such as snowy road, it will be appreciated that rapid engine brake can be avoided by applying the torque transfer slower than usually, which leads ultimately to slip accident avoidance.

[Creep Control] Part 1

Figure 10:
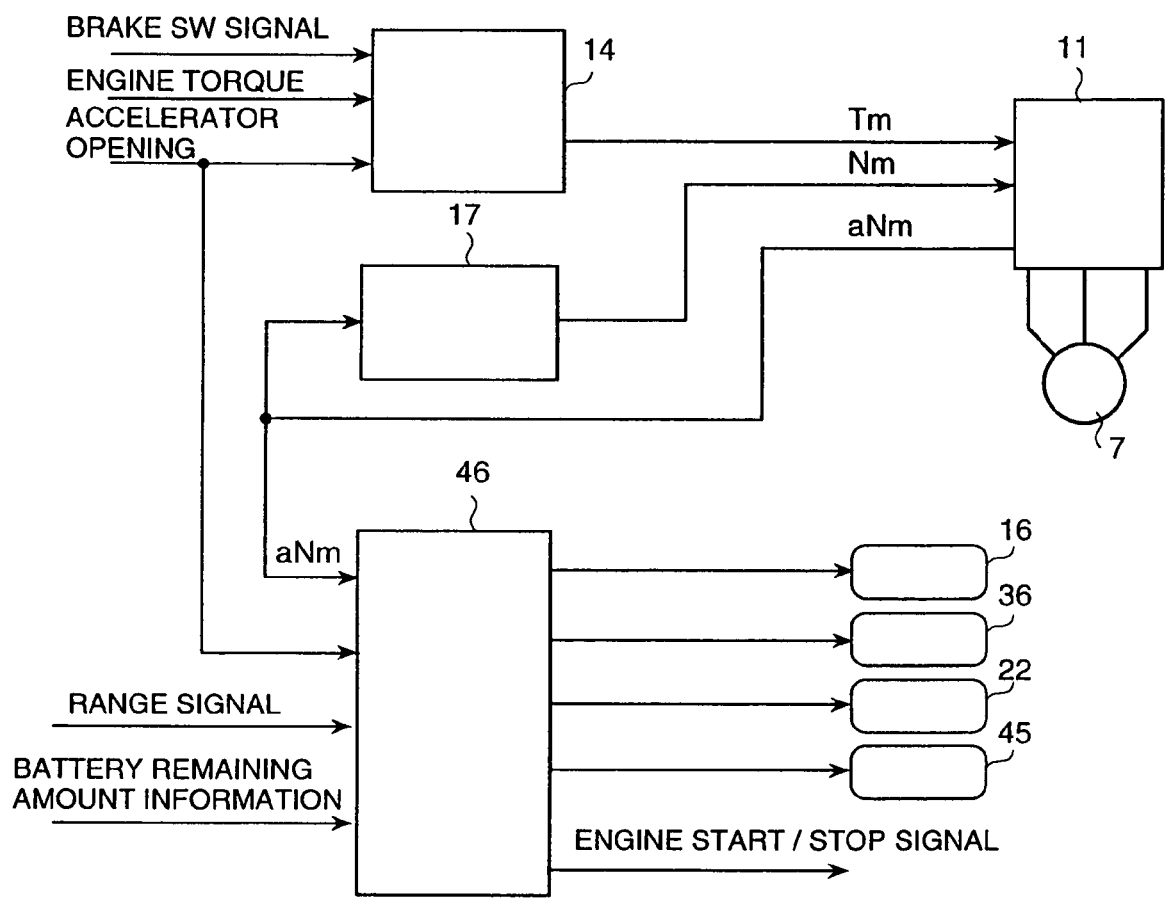
FIG. 10 is a block diagram illustrating the structure of the creep control system in the third embodiment of the present invention.
Figure 11:
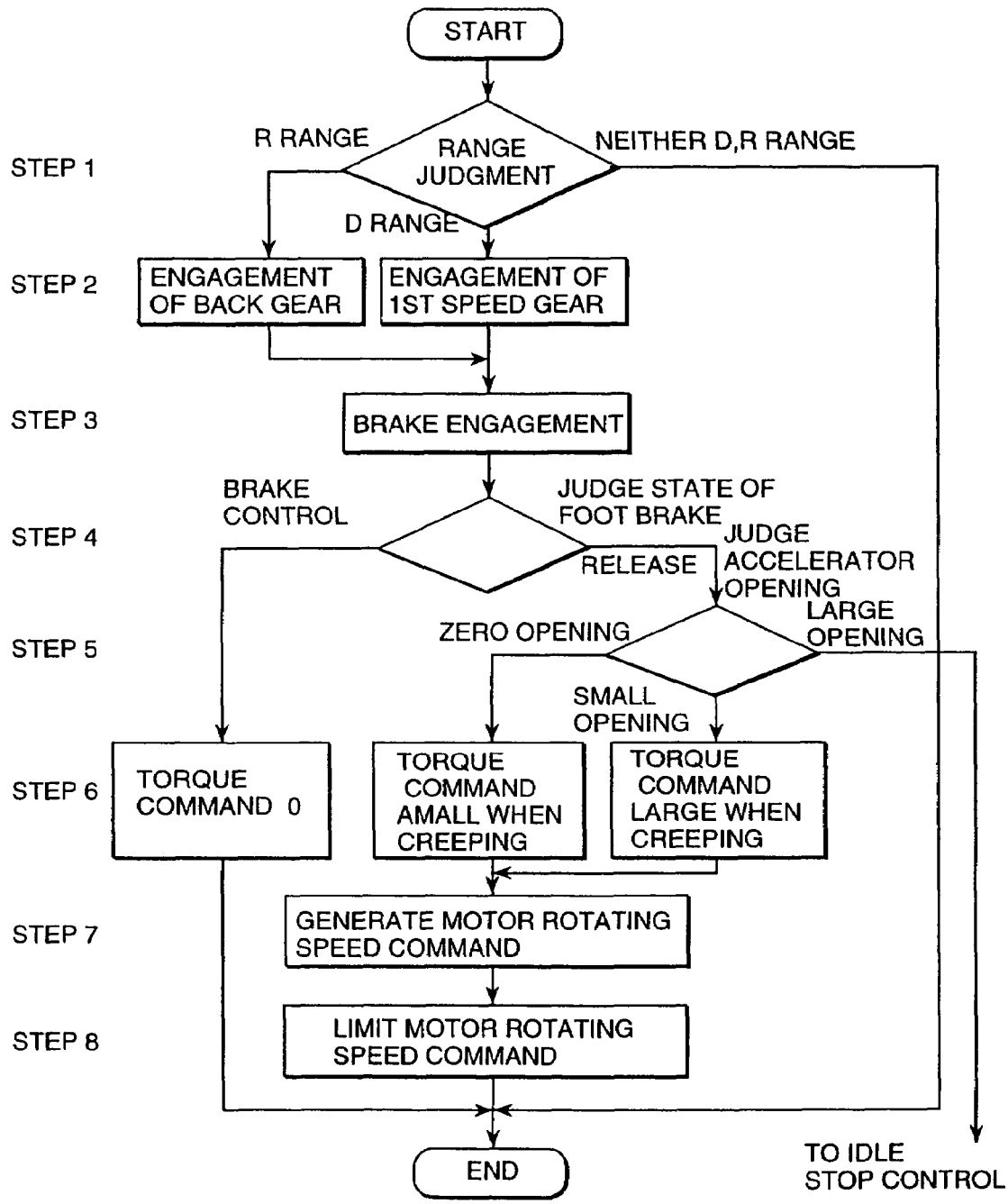
FIG. 11 is a flow chart illustrating the software configuration of the creep control system shown in FIG. 10.

FIG. 10 shows a block diagram for the creep control in the third embodiment of the present invention, and FIG. 11 shows a flow chart of its control scheme The structural components and their control method are identical to the embodiment 1. The control scheme is described below by referring to FIGS. 10 and 11.

When the select lever (not shown) is positioned at P range, the automobile starting control part 46 releases the clutches 2 and 3, the dog clutches 29 to 31 and the brake 45, and thus the engine stops and the automobile is in the stopped state. When the select lever is activated, the automobile starting control part 46 detects the range at Step 1, and if the range is D-range, Step 2 is selected next, in which the shift fork 32 is made slide by operating the shift actuator 16 and then the dog clutch 29 is made link to the first speed gear 24. If the range is R-range, the shift fork 34 is made slide by operating the shift actuator 36 and then the dog clutch 31 is made link to the reverse gear 28. Otherwise, the creep control is skipped. In Step 3, the brake 45 is engaged and then the automobile starting preparation is completed.

In Step 4, the state of the foot brake is detected, and if the foot brake is activated, the motor torque instruction part 14 outputs the motor torque instruction to be 0 in Step 6, and therefore, the electric motor control electronics 11 shuts down the motor current. If the foot brake is released, the accelerator opening is judged in Step 5, and if the opening is judged to be 0, the motor torque instruction part 14 supplies the creep-mode motor torque instruction in small value to the electric motor control electronics 11. If the accelerator pedal is pressed down within a designated range, the motor torque instruction part 14 supplies the creep-mode motor torque instruction larger than the case of releasing the acceleration pedal in order to support the state that the automobile starts on the sloping road or climbs over the curbstone. If the accelerator pedal is pressed down deeply more than a designated value, the idling stop control as shown in the forth embodiment is invocated.

The actual motor speed aNm detected at the electric motor control electronics 11 is supplied to the motor speed instruction part 17, and when this motor speed is supplied as the motor speed instruction Nm to the electric motor control electronics 11 in Step 7, the motor speed increases as the automobile increases its speed. As the slow-speed running is required for the creep control, the motor speed is limited in Step 8.

By using the control method of this embodiment, even if the torque converter is not installed between the engine and the automatic transmission, the creep running is enabled similarly to the automobile with the conventional automatic transmission, which brings an effective impact in increasing the drivability when running the automobile very slowly such as putting the automobile into the garage.

[Idling Stop Automobile Starting Control] Part 1

Figure 12:
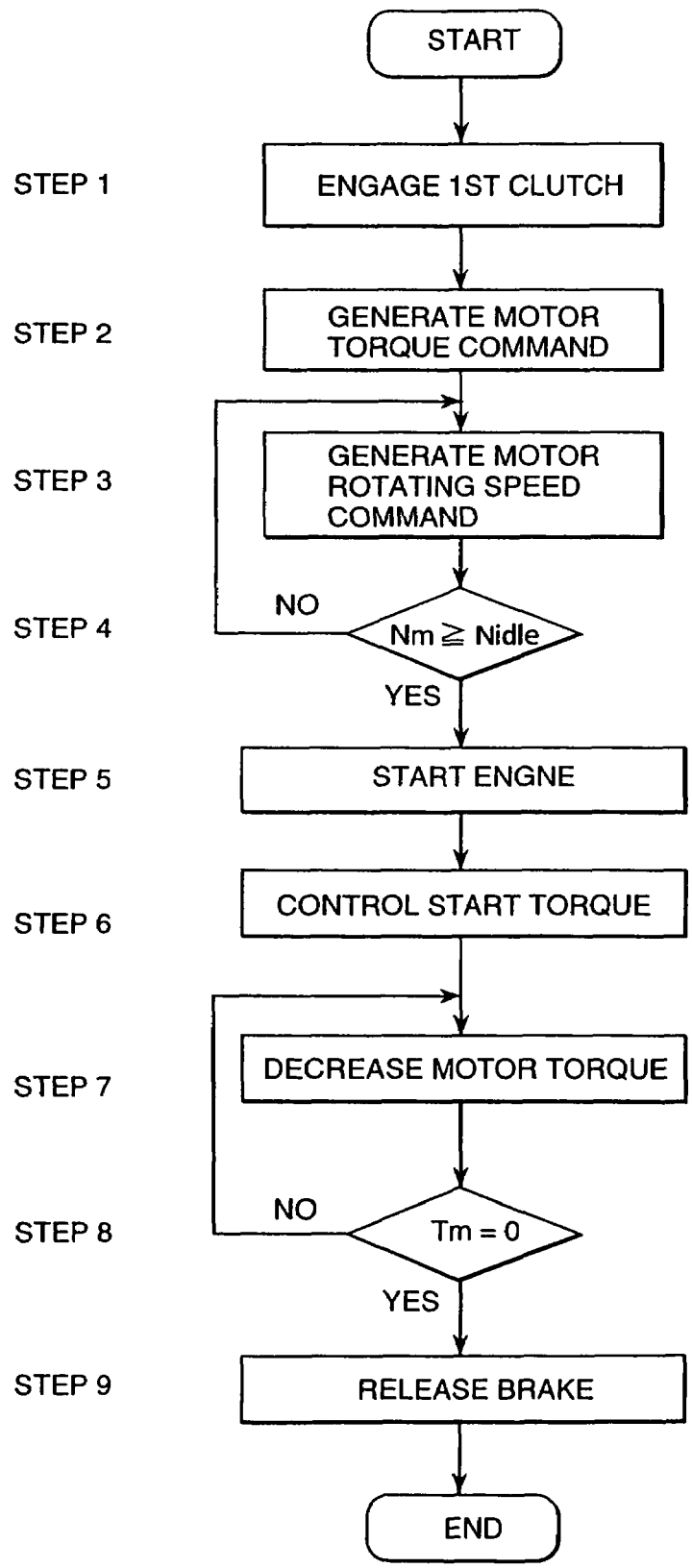
FIG. 12 is a flow chart illustrating the software configuration of the automobile starting control system in the forth embodiment of the present invention.
Figure 13:
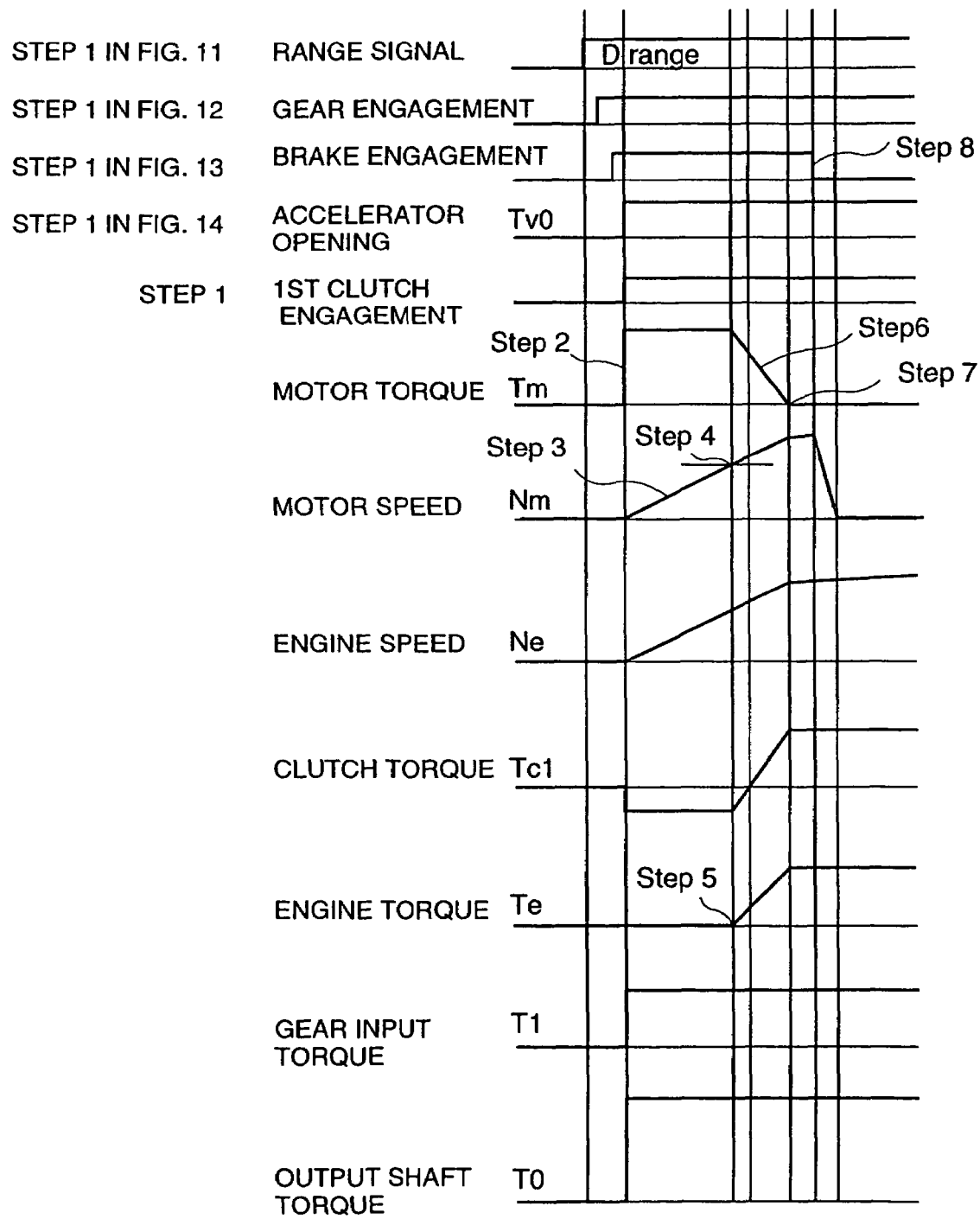
FIG. 13 is a time chart illustrating the changes in the torque and the rotating speed in the automobile starting control system shown in FIG. 12.

FIG. 12 is a flowchart illustrating the automobile starting control scheme in the idling stop control in the forth embodiment of the present invention. The steps from the starting preparation to the judgment of the accelerator opening are identical to the steps of the flowchart for the creep control as shown in FIG. 11 in the third embodiment. The structural components and their control method are identical to the embodiment 1. FIG. 13 shows a time chart illustrating the changes in the torque and the rotating speed in the control action.

The automobile starting control in the idling stop control is shown by referring to FIGS. 10 to 13. The automobile starting preparation is performed in the procedures shown in FIG. 11. When the select lever is activated, the automobile starting control part 46 detects the range at Step 1, and if the range is D-range, Step 2 is selected next, in which the shift the shift fork 32 is made slide by operating the shift actuator 16 and then the dog clutch 29 is made link to the first speed gear 24. If the range is R-range, the shift fork 34 is made slide by operating the shift actuator 36 and then the dog clutch 31 is made link to the reverse gear 28. In Step 3, the brake 45 is engaged and then the automobile starting preparation is completed.

In Step 4, the state of the foot brake is detected, and if the foot brake is activated, the accelerator opening is judged in Step 5, and if the accelerator pedal is pressed down deeply more than a designated value, the automobile starting control of the idling stop control is invocated. The automobile starting control is performed in the procedures shown in FIG. 12. In Step 1 of FIG. 12, the automobile starting control part 46 engages the first clutch 2 by operating the clutch actuator 22. In Step 2, the motor torque instruction part 14 supplies the starting-mode motor torque instruction corresponding to the accelerator opening to the electric motor control electronics 11. As the rotor 40 is locked while the electric motor 7 generates torque, the rotor 39 begins to rotate itself and drives the first clutch shaft 37. Thus, the output shaft 6 is driven through the first speed gear 24 and then the automobile starts running. On the other hand, as the first clutch 2 is engaged, a part of the motor torque contributes to the rotational movement of the engine. Thus, the clutch torque is negative in Step 2.

The actual motor speed aNm detected at the electric motor control electronics 11 is supplied to the motor speed instruction part 17, and as this motor speed is supplied as the motor speed instruction Nm to the electric motor control electronics 11 in Step 3, the motor speed increases as the automobile increases its speed.

In Step 4, the automobile starting control part 46 judges the motor speed, that is, the engine speed, and if it judges that whether the engine speed becomes the idling engine speed or higher, it issues the engine fuel injection and ignition instruction at Step 5, and then the engine starts. As both of the engine torque and the motor torque are applied to the first clutch output shaft 37, the torque required for the automobile starting and accelerating operations is adjusted by the motor torque instruction part 14 in Step 6. As the electric motor 7 can generates the torque equivalent to the engine torque, twice the engine torque can be obtained, which enables the automobile starting and accelerating control comparable to the conventional torque converter. After the automobile starting control is completed, the motor torque instruction part 14 decreases the motor torque Tm in Step 7, and if the motor torque reaches 0 is judged in Step 8, the brake 45 is released in Step 9, and finally the automobile starting control of the idling stop control is completed.

Next, the automobile stopping control of the idling stop control is described. As the auto-motive speed reduces at the accelerator opening 0, the transmission shifts the gears down to the first speed gear in obedience to the shifting gear curve, and when the engine speed becomes the idling speed or lower as the auto-motive speed reduces more, the auto-motive starting control part 46 releases the first clutch 2 and stops the engine. When the auto-motive speed becomes 0, the auto-motive starting preparation is performed by executing Steps 1 to 3 in FIG. 11 in responsive to the range signal as described above.

According to the method of this embodiment, as the useless fuel to be consumed is saved by stopping the engine when the auto-motive stops temporarily while waiting for the lights to change, there is such an effect that an excellent gas mileage can be attained. And further, as the starting torque at most twice as usual by adding the engine torque generated by the electric motor can be obtained when the automobile starts running, an alternate function for the torque converter can be obtained, and thus a low-cost system can be provided by removing the torque converter.

In this embodiment, the brake 45 is installed for fixing the second clutch output shaft 38 at the transmission housing 23 in order to block the reactive force developed by the torque applied by the electric motor 7 to the first clutch output shaft 37 connected to the first speed gear. The reactive force developed in a direction opposite to the engine rotation direction is applied to the second clutch output shaft 38 in order to make the first clutch output shaft 37 rotate in the engine rotation direction by the electric motor 7. Therefore, as the brake 45 may have an ability to block the reactive force developed in a direction opposite to the engine rotation direction, the bake can be made with an one-way clutch instead of using a band brake or a multiple disc clutch. As the second clutch output shaft 38 always rotates in the engine rotation direction after the automobile starting control is completed and the second clutch is engaged, the one-way clutch is always released and it stays in such a state that the brake 45 is released in Step 9. In case of using the one-way clutch, as the actuators, the hydraulic power source and the pneumatic power source for engaging the brake 45 is not required, the structure can be simplified, and further, the control scheme can be simplified by removing Step 3, Step 8 and Step 9, which leads to increase the software productivity effectively.

[Idling Stop Automobile Starting Control] Part 2

Figure 14:
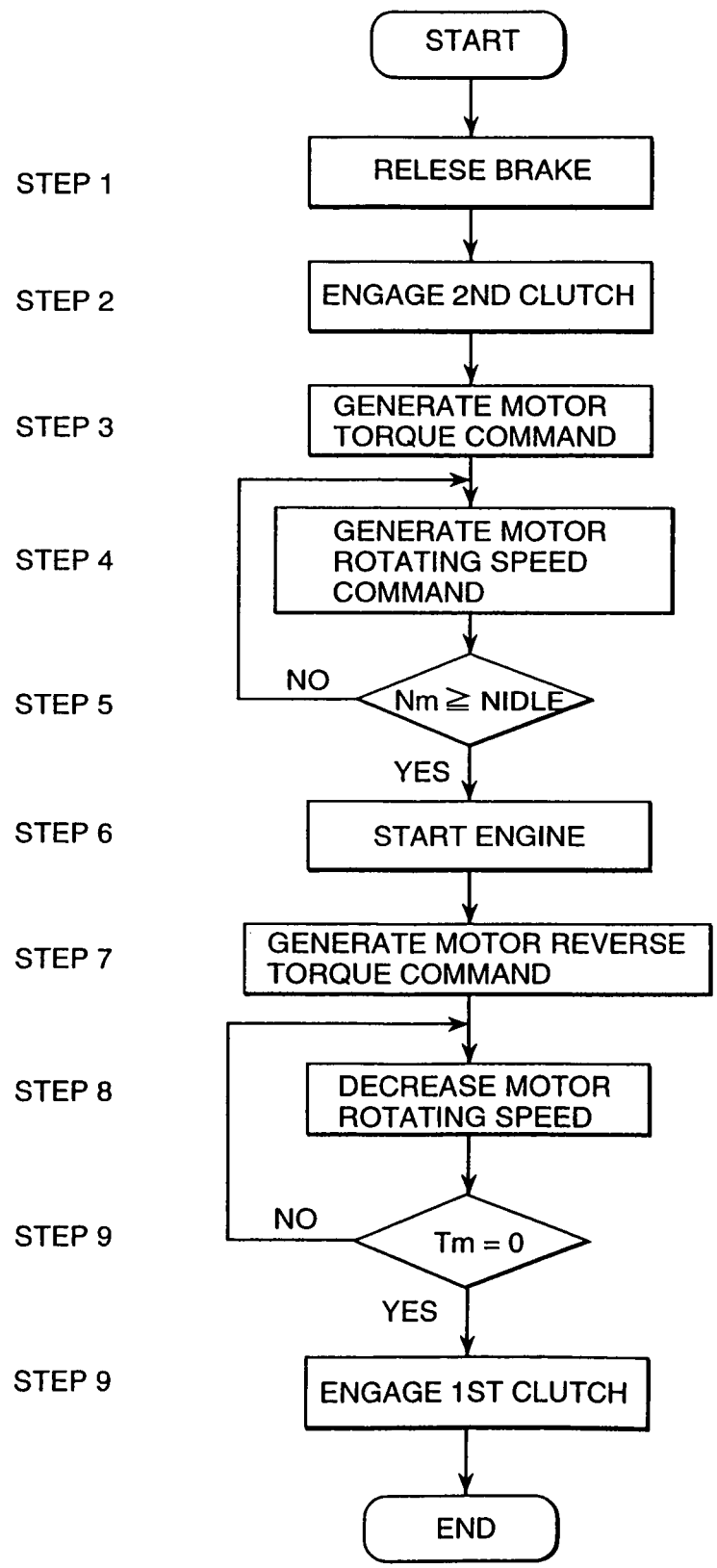
FIG. 14 is a flow chart illustrating the software configuration of the automobile starting control system shown in FIG. 14.
Figure 15:
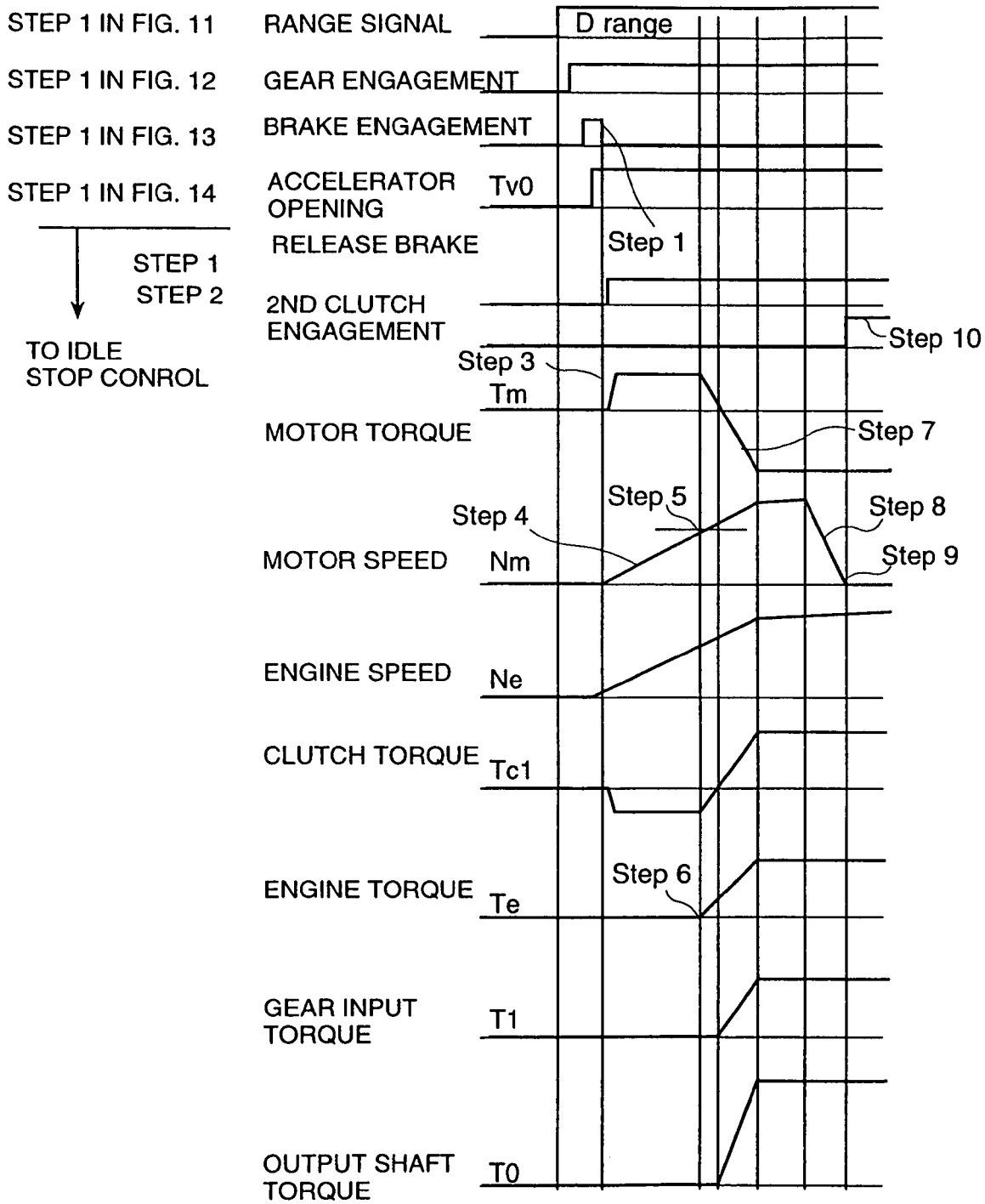
FIG. 15 is a time chart illustrating the changes in the torque and the rotating speed in the automobile starting control system shown in FIG. 14.

FIG. 14 is a flowchart illustrating the automobile starting control scheme in the idling stop control in the fifth embodiment of the present invention. The steps from the starting preparation to the judgment of the accelerator opening are identical to the steps of the flowchart for the creep control as shown in FIG. 11 in the third embodiment. The structural components and their control method are identical to the embodiment 1. FIG. 15 shows a time chart illustrating the changes in the torque and the rotating speed in the control action.

The automobile starting control in the idling stop control is shown by referring to FIG. 10, FIG. 11, FIG. 14 and FIG. 15. The automobile starting preparation is performed in the procedures shown in FIG. 11. When the select lever is activated, the automobile starting control part 46 detects the range at Step 1 of FIG. 11, and if the range is D-range, Step 2 is selected next, in which the shift the shift fork 32 is made slide by operating the shift actuator 16 and then the dog clutch 29 is made link to the first speed gear 24. If the range is R-range, the shift fork 34 is made slide by operating the shift actuator 36 and then the dog clutch 31 is made link to the reverse gear 28. In Step 3, the brake 45 is engaged and then the automobile starting preparation is completed.

In Step 4, the state of the foot brake is detected, and if the foot brake is released, the accelerator opening is judged in Step 5, and if the accelerator pedal is pressed down deeply more than a designated value, the automobile starting control of the idling stop control is invocated. The automobile starting control is performed in the procedures shown in FIG. 14.

In Step 1 of FIG. 14, the brake 45 engaged before is released. If the one-way clutch is used for the brake 45, this step can be omitted. The automobile starting control part 46 engages the second clutch 3 in Step 2, and the motor torque instruction part 14 generates the starting engine torque instruction in Step 3. The rotor 40 of the electric motor 7 drives the engine through the second clutch 3, but the reactive force developed at the stator 39 of the electric motor 7 attempts to drive the output shaft 37 of the first clutch in a direction opposite to the usual direction. However, as the first speed gear 24 or the reverse gear 28 installed at the output shaft 37 of the first clutch is engaged in Step 2 of FIG. 11 at the automobile starting preparation process, the torque generates slightly as the output shaft 6 due to this reactive force, which is too small to move the automobile. By means that a one-way clutch is installed between the output shaft 37 of the first clutch and the transmission housing 23, the reactive torque does not transfer to the output shaft.

As the actual motor speed aNm detected at the electric motor control electronics 11 is supplied to the motor speed instruction part 17, if this motor speed is supplied as the motor speed instruction Nm to the electric motor control electronics 11 in Step 4, the motor speed increases as the automobile increases its speed. In Step 5, the automobile starting control part 46 judges the motor speed, that is, the engine speed, and if it judges that whether the engine speed becomes the idling engine speed or higher, it issues the engine fuel injection and ignition instruction at Step 6, and then the engine starts. When the engine starts, the engine speed becomes larger than the idling engine speed and the regeneration current flows into the electric motor 7. When the motor torque instruction part 14 generates the torque instruction for turning over the rotation direction in Step 7, the engine is loaded, and the engine torque is applied to the output shaft 37 of the first clutch or the reverse gear 28 through the second clutch 3, the output shaft 38 of the second clutch and the electric motor, and then the traction torque is generated at the output shaft 6. When the motor torque increases such that Tm−Te, then the engine load reaches its maximum value, and the motor speed instruction part 17 reduces the motor speed Nm while holding the maximum engine load in Step 8. The automobile starting control part 46 judges the synchronized state of the first clutch 2 by observing Nm=0 in Step 9, and then the automobile starting control of the idling stop control is terminated by operating the clutch actuator 22 for engaging the first clutch 2 in Step 10.

The engine load control by the motor torque after engine starting-up and the clutch synchronizing control with reference to the motor speed are equivalent to the operations for shifting up gears as described in the second embodiment, which corresponds to the torque phase and the inertia phase, respectively, considered as the 0-to-1 gear shift operation. Therefore, as this process is related to the potential energy moving from high level to low level, the engine output during this process is used for charging the battery and gradually transfer the energy to the output shaft. There is such as effect that this control can be performed even if the battery remaining is small, and that the reliability can be increased.

By means that the battery remaining information is supplied into the automobile starting control part 46 in the block diagram of FIG. 10, if the battery remaining is larger, the automobile starting control is performed in the method of the forth embodiment in order to increase the acceleration performance with higher starting torque, and if the battery remaining is small, the automobile starting control is performed in the method of the fifth embodiment in order to establish the steady starting operation while charging the battery when starting the automobile, and thus, both control methods can be altered.

[Creep Control] Part 2

Figure 17:
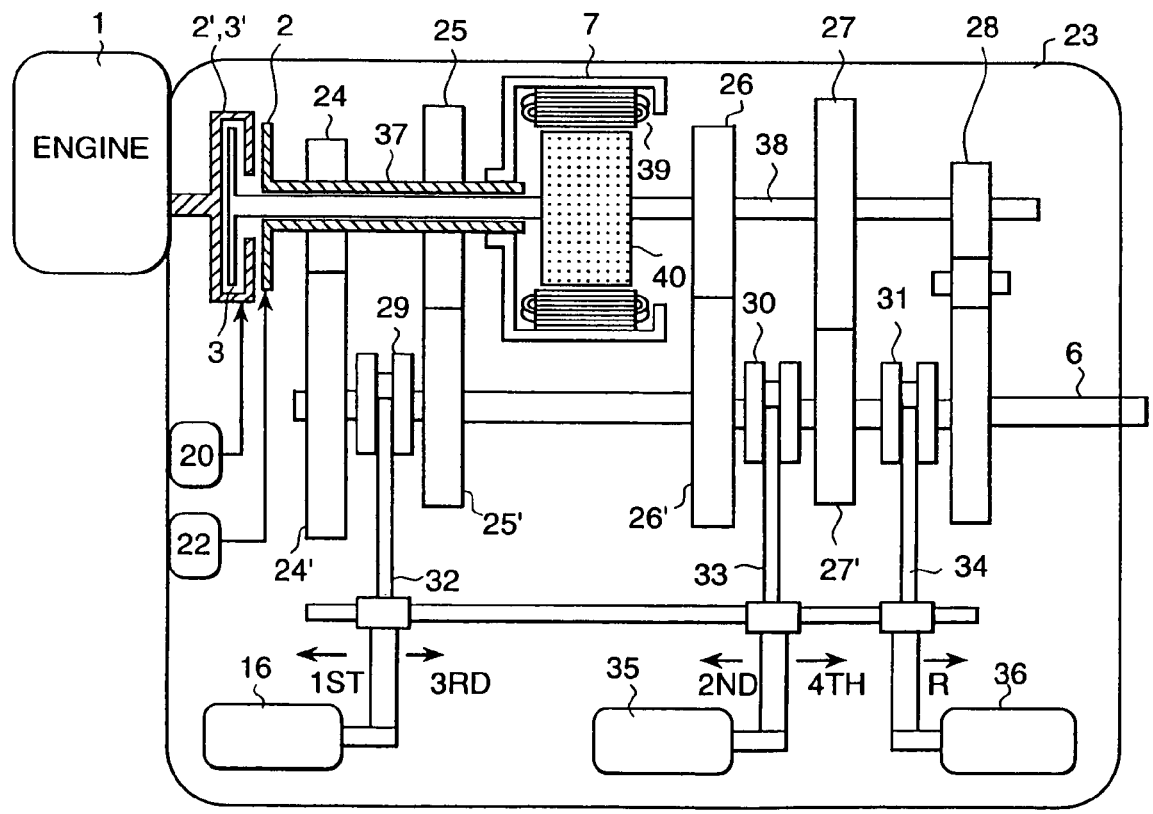
FIG. 17 is a structural drawing illustrating the structure of the transmission used in the sixth embodiment of the present invention.
Figure 16:
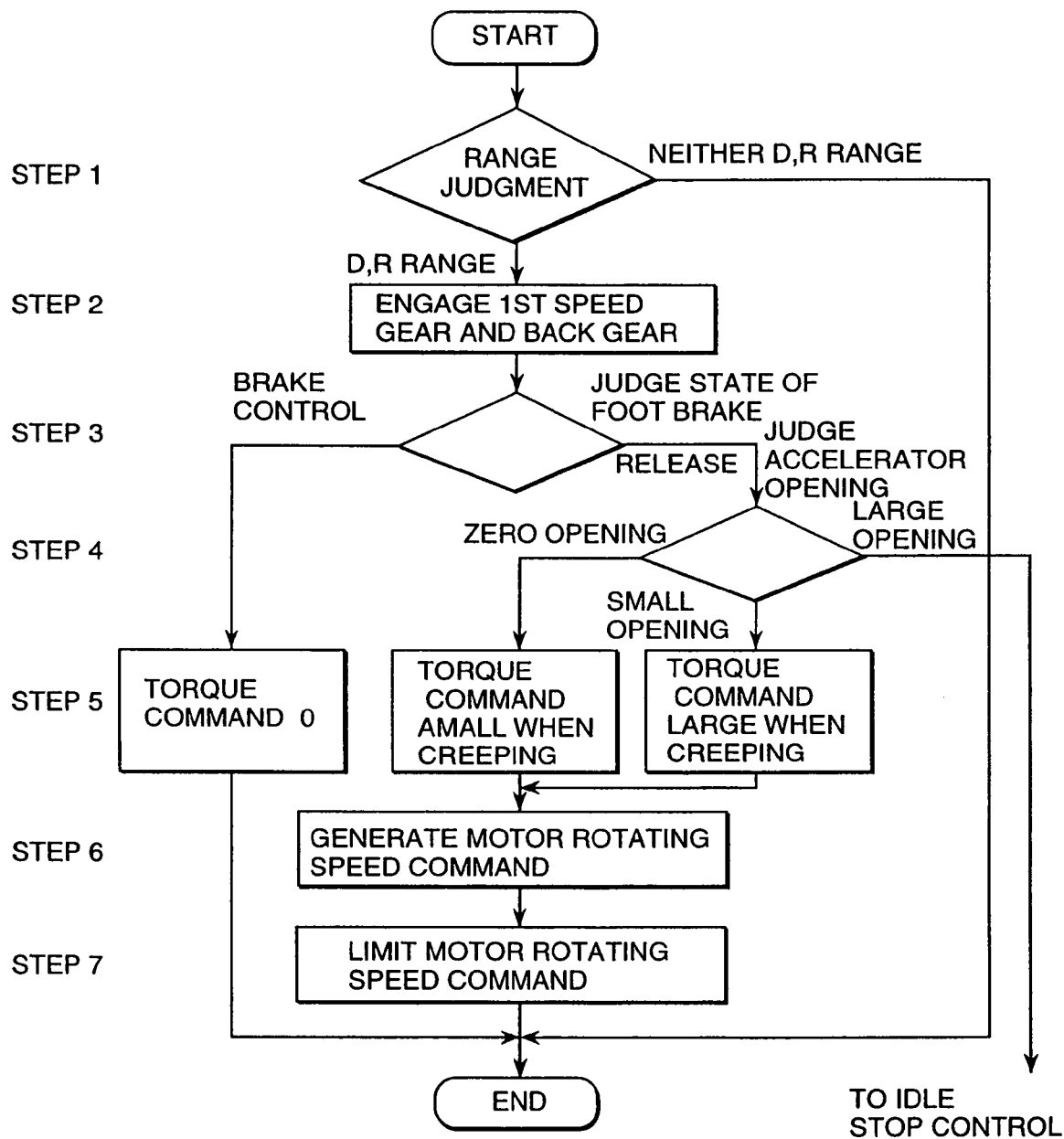
FIG. 16 is a flow chart illustrating the software configuration of the creeping control in the sixth embodiment of the present invention.

FIG. 16 shows a flow chart of the creep control in the sixth embodiment of the present invention. FIG. 17 shows a structure of the transmission used in this embodiment. The difference from the structure shown in FIG. 4 is that the reverse gear 28 is connected to the output shaft 38 of the second clutch and that the brake 45 is removed. The control block diagram of this embodiment is identical to FIG. 10. The control method of the structure element is identical to the method in the first embodiment. By referring to FIG. 10, FIG. 16 and FIG. 17, the control scheme of the creep control is described.

When the select lever (not shown) is positioned at P range, the automobile starting control part 46 releases the clutches 2 and 3, the dog clutches 29 to 31 and the brake 45, and thus the engine stops and the automobile is in the stopped state. When the select lever is activated, the automobile starting control part 46 detects the range at Step 1, and if the range is D-range or R-range, Step 2 is selected next, in which the shift forks 32 and 34 are made slide by operating the shift actuators 16 and 36 and then the dog clutch 29 is made link to the first speed gear 24, the dog clutch 31 is made link to the reverse gear 28, and then the automobile starting preparation is completed.

In Step 3, the state of the foot brake is detected, and if the foot brake is activated, the motor torque instruction part 14 outputs the motor torque instruction to be 0 in Step 5, and therefore, the electric motor control electronics 11 shuts down the motor current. If the foot brake is released, the accelerator opening is judged in Step 4, and if the opening is judged to be 0, the motor torque instruction part 14 supplies the creep-mode motor torque instruction in small value to the electric motor control electronics 11 in Step 5. If the accelerator pedal is pressed down within a designated range, the motor torque instruction part 14 supplies the creep-mode motor torque instruction larger than the case of releasing the acceleration pedal in order to support the state that the automobile starts on the sloping road or climbs over the curbstone. If the accelerator pedal is pressed down deeply more than a designated value, the idling stop control as shown in the forth embodiment is invocated.

The actual motor speed aNm detected at the electric motor control electronics 11 is supplied to the motor speed instruction part 17, and when this motor speed is supplied as the motor speed instruction Nm to the electric motor control electronics 11 in Step 7, the motor speed increases as the automobile increases its speed. As the slow-speed running is required for the creep control, the motor speed is limited in Step 7.

In using the creep control method of this embodiment, as the first speed gear and the reverse gear are linked simultaneously, the equation (4) or (8) with Te=0 provides the output shaft torque To as $$To = (i1 - i2)Tm \quad \text{[Formula 9]}$$

For example, suppose that the first speed gear ratio i1=2.8 and the reverse gear ratio i2=−2.3, To=5.1Tm. As the larger torque can be obtained in comparison with the case that twice the torque amplification factor is obtained by installing the torque converter between the engine and the automatic transmission, there is such an effect that the automobile can climb over the curbstone easily and the drivability can be increased.

According to the method of this embodiment, as the automobile starts running by engaging the first speed gear 24 and the reverse gear 28, the driving characteristic while the creep control can be increased with large starting torque as well as a low-cost system can be established because the brake 45 is not required.

[Idling Stop Automobile Starting Control] Part 3

Figure 18:
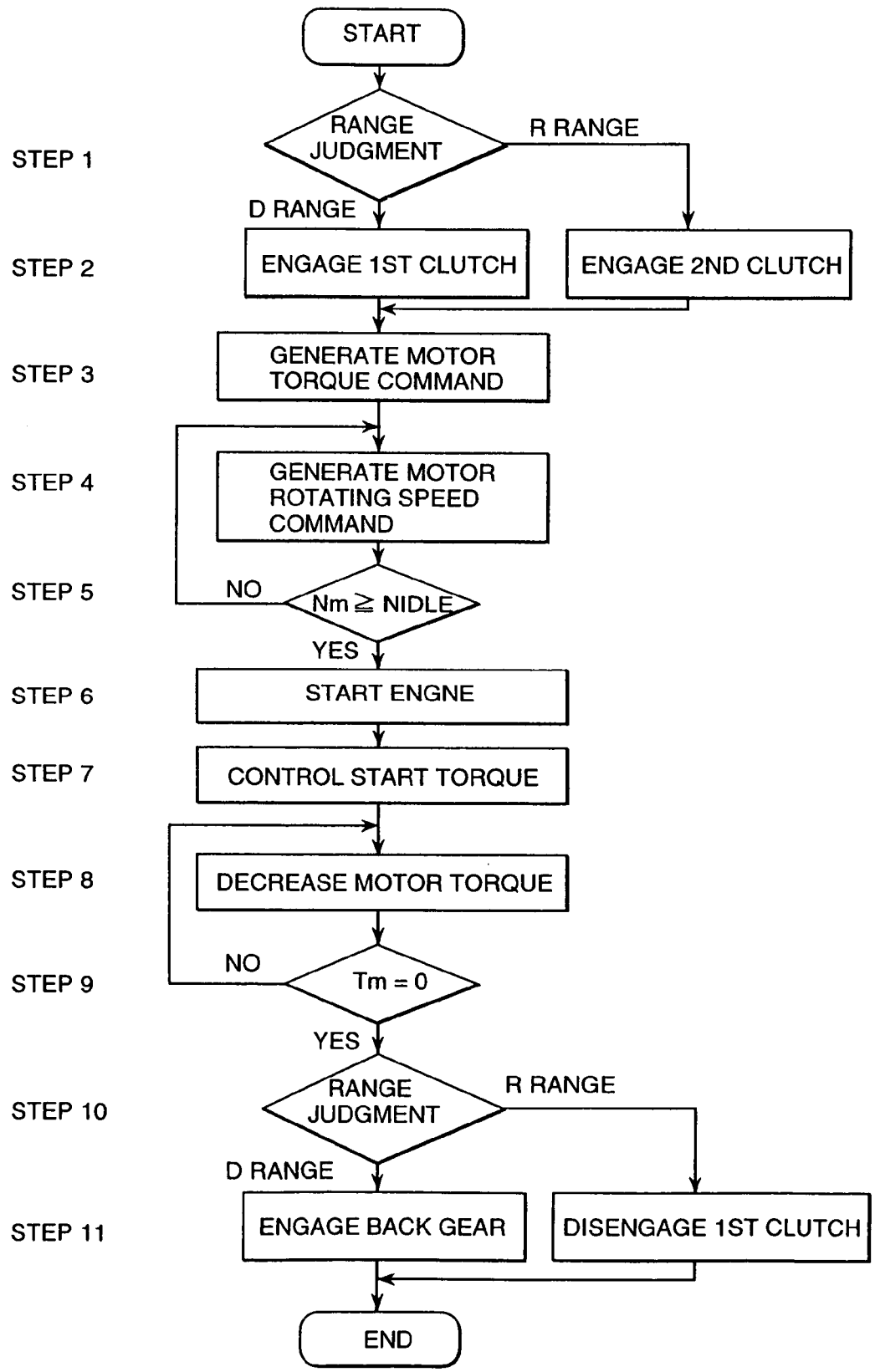
FIG. 18 is a flow chart illustrating the software configuration of the automobile starting control system in the seventh embodiment of the present invention.

FIG. 18 is a flowchart illustrating the idling stop control in the seventh embodiment of the present invention. The transmission used in this embodiment is shown in FIG. 17. The feature of this embodiment different from the structure shown in FIG. 4 is that the reverse gear 28 is connected to the output shaft 38 of the second clutch and the brake 45 is removed. The control block diagram of this embodiment is identical to that shown by FIG. 10. The control method of the structure element is identical to the method in the first embodiment. By referring to FIG. 10 and FIG. 18, the control scheme of the idling stop control is described.

When the automobile starting control of the idling stop control is invoked in Step 4 of FIG. 16 shown for the sixth embodiment, the procedures in the flow chart of FIG. 18 is initiated. Therefore, the first speed gear and the reverse gear are connected in advance in Step 2 of FIG. 16. The automobile starting control part 46 judges the range in Step of in FIG. 18, and if the range is D-range, the first clutch 2 is engaged by operating the clutch actuator 22 in Step 2. If the range is R-range, the second clutch 3 is engaged by operating the clutch actuator 20 in Step 2. The motor torque instruction part 14 generates the automobile starting torque instruction in Step 3.

According to the above procedures, if the range is D-range, the stator 39 of the electric motor 7 drives the first speed gear 24 through the output shaft 37 of the first clutch. As the rotor 40 of the electric motor 7 rotates the second clutch 38 in a direction opposite to the usual direction due to the reactive force generated here, it rotates the reverse gear 28 connected to the second clutch 38 in a reverse direction. Therefore, the sum of the torque of the output torque of the first speed gear 24 and the torque of the reverse gear 28 in a forward direction is supplied to the output shaft 6, which moves the automobile. On the other hand, the torque of the stator 39 of the electric motor 7 rotates the engine through the first clutch 2.

In case of R-range, in making the electric motor rotate in a reverse direction, the stator 39 of the electric motor 7 rotates the first speed gear 24 in a direction opposite to the usual direction through the output shaft 37 of the first clutch. As the rotor 40 of the electric motor 7 rotates the second clutch 38 in a direction opposite to the usual direction due to the reactive force generated here, it rotates the reverse gear 28 connected to the second clutch 38 in a reverse direction. Therefore, the sum of the torque of the output torque of the reverse gear 28 and the torque of the first speed gear 24 in a backward direction is supplied to the output shaft 6, which moves the automobile. On the other hand, a part of the torque of the rotor 40 of the electric motor 7 rotates the engine in a forward direction through the second clutch 3. In either way, the engine is driven in a forward direction while moving the automobile in a designated direction. The clutch torque is negative in Step 3.

As the actual motor speed aNm detected at the electric motor control electronics 11 is supplied to the motor speed instruction part 17, if this motor speed is supplied as the motor speed instruction Nm to the electric motor control electronics 11 in Step 4, the motor speed increases as the automobile increases its speed. In Step 5, the automobile starting control part 46 judges the motor speed, that is, the engine speed, and if it judges that whether the engine speed becomes the idling engine speed or higher, it issues the engine fuel injection and ignition instruction at Step 6, and then the engine starts. When the engine starts, as both of the engine torque and the motor torque are applied to the output shaft 37 of the first clutch for D-range or to the output shaft 38 of the second clutch for R-range, the motor torque instruction part 14 adjusts the torque required to start and accelerate the automobile in Step 7. After completing the automobile starting control, the motor torque instruction part 14 reduces the motor torque Tm in Step 8, and then if the motor torque is judged to be 0 in Step 9, the range is judged in Step 10, and then the reverse gear 28 is released by operating the shift actuator 36 for D-range in Step 11. If the range is R-range, the firs gear 24 is released by operating the shift actuator 16 in Step 11, and finally the automobile starting control of the idling stop control is terminated.

According to the method of this embodiment, as the automobile starts running by engaging the first speed gear 24 and the reverse gear 28, the driving characteristic while the idling stop control can be increased with large starting torque as well as a low-cost system can be established because the brake 45 is not required.

[Idling Stop Automobile Starting Control] Part 4

Figure 19:
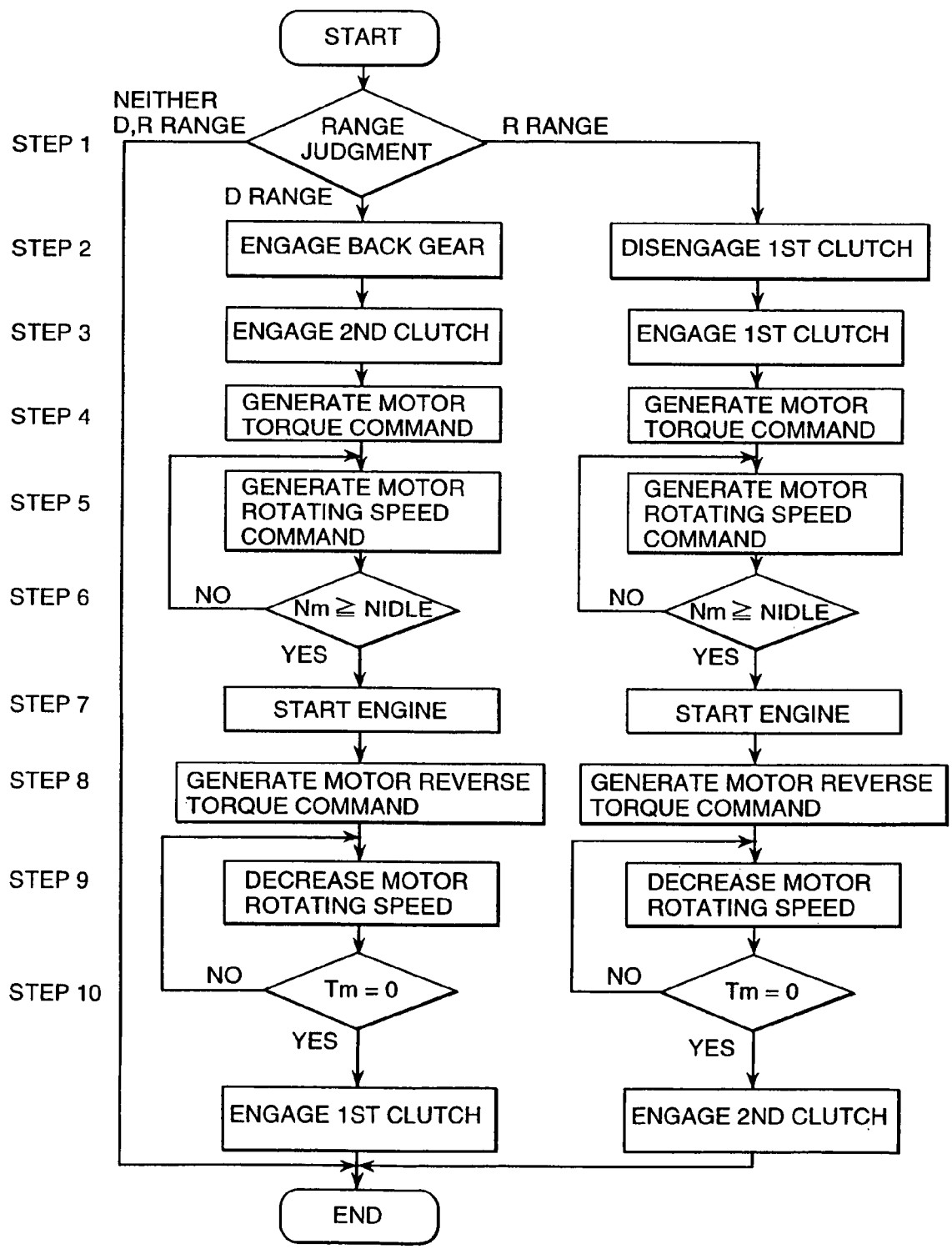
FIG. 19 is a flow chart illustrating the software configuration of the automobile starting control system in the eighth embodiment of the present invention.

FIG. 19 is a flowchart illustrating the idling stop control in the eighth embodiment of the present invention. The transmission used in this embodiment is shown in FIG. 17. The feature of this embodiment different from the structure shown in FIG. 4 is that the reverse gear 28 is connected to the output shaft 38 of the second clutch and the brake 45 is removed. The control block diagram of this embodiment is identical to that shown by FIG. 10. The control method of the structure element is identical to the method in the first embodiment. By referring to FIG. 10 and FIG. 19, the control scheme of the idling stop control is described.

When the automobile starting control of the idling stop control is invoked in Step 4 of FIG. 16 shown for the sixth embodiment, the procedures in the flow chart of FIG. 19 are initiated. Therefore, the first speed gear and the reverse gear are connected in advance in Step 2 of FIG. 16.

The automobile starting control part 46 judges the range in Step 1 of in FIG. 19, and if the range is D-range, the reverse gear 28 is released by operating the shift actuator 36 in Step 2, and if the range is R-range, the second clutch 3 is engaged by operating the clutch actuator 22 in Step 3. When the motor torque instruction part 14 generates the automobile starting torque instruction in Step 4, as the rotor 40 of the electric motor 7 rotates the output shaft 38 of the second clutch, it rotates the engine through the second clutch 3. At this time, the reactive force developed at the stator 39 of the electric motor 7 attempts to rotates the output shaft 37 of the first clutch in a direction opposite to the usual direction However, as the first speed gear 24 installed on the output shaft 37 of the first clutch is linked in advance in Step 2 of FIG. 16, the torque generated at the output shaft 6 due to this reactive force is too small to move the automobile.

As the actual motor speed aNm detected at the electric motor control electronics 11 is supplied to the motor speed instruction part 17, if this motor speed is supplied as the motor speed instruction Nm to the electric motor control electronics 11 in Step 5, the motor speed increases little by little. In Step 6, the automobile starting control part 46 judges the motor speed, that is, the engine speed, and if it judges that whether the engine speed becomes the idling engine speed or higher, it issues the engine fuel injection and ignition instruction in Step 7, and then the engine starts.

When the engine starts, the engine speed becomes larger than the idling engine speed and the regeneration current flows into the electric motor 7. When the motor torque instruction part 14 generates the torque instruction for turning over the rotation direction in Step 8, the engine is loaded, and the engine torque is applied to the output shaft 37 of the first clutch or the reverse gear 28 through the second clutch 3, the output shaft 38 of the second clutch and the electric motor, and then the traction torque is generated at the output shaft 6. When the motor torque increases such that Tm−Te, then the engine load reaches its maximum value, and in Step 8, the motor speed instruction part 17 reduces the motor speed Nm while holding the maximum engine load. The automobile starting control part 46 judges the synchronized state of the first clutch 2 by observing Nm=0 in Step 9, and then the automobile starting control of the idling stop control is terminated by operating the clutch actuator 22 for engaging the first clutch 2 in Step 10.

If the range is judged to be R-range in Step 1, the same control scheme can be performed, which procedures is shown at the right side in FIG. 19.

The engine load control by the motor torque after engine starting-up and the clutch synchronizing control with reference to the motor speed are equivalent to the operations for shifting up gears as described in the second embodiment, which corresponds to the torque phase and the inertia phase, respectively, considered as the 0-to-1 gear shift operation. Therefore, as this process is related to the potential energy moving from high level to low level, the engine output during this process is used for charging the battery and gradually transfer the energy to the output shaft. There is such as effect that this control can be performed even if the battery remaining is small, and that the reliability can be increased.

By means that the battery remaining information is supplied into the automobile starting control part 46 in the block diagram of FIG. 10, if the battery remaining is larger, the automobile starting control is performed in the method of the forth embodiment in order to increase the acceleration performance with higher starting torque, and if the battery remaining is small, the automobile starting control is performed in the method of the fifth embodiment in order to establish the steady starting operation while charging the battery when starting the automobile, and thus, both control methods can be altered.

According to the method of this embodiment, a low-cost system can be established because the brake 45 is not required.

[Exhaust Gas Reduction Control]

70% or more of the emission of the injurious ingredient such as HC in the exhaust gas from the automobile is generally said to be exhausted during the cold running immediately after starting the engine in a single running period.

Figure 20:
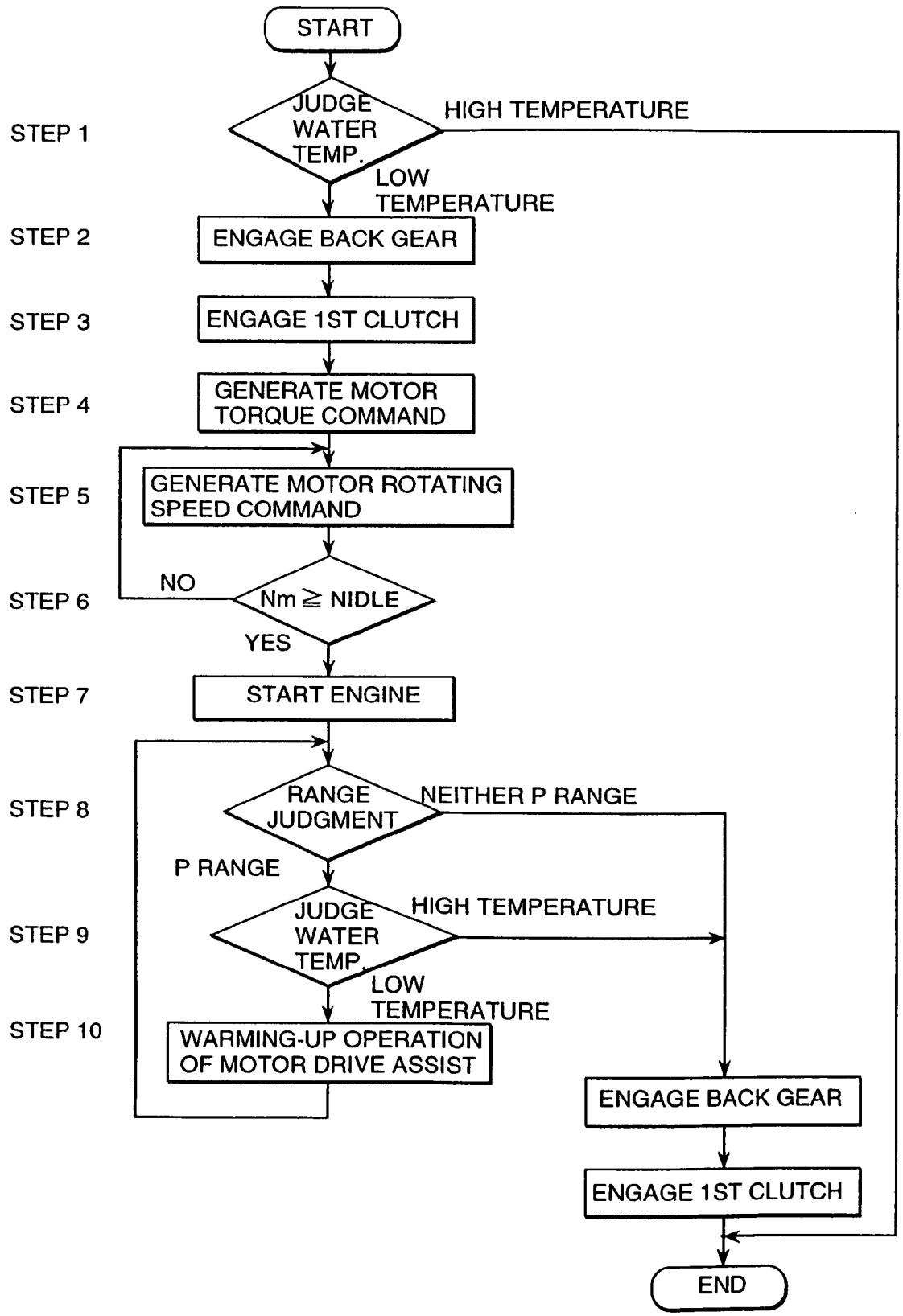
FIG. 20 is a flow chart illustrating the software configuration of the emission gas reduction control system in the ninth embodiment of the present invention.

The ninth embodiment of the present invention reduce the emission of the injurious ingredient in the exhaust gas immediately after starting the engine, and its control procedure is shown in FIG. 20. The structure of the transmission used in this embodiment is identical to that shown in FIG. 10. The control method of the structure element is identical to the method in the first embodiment. By referring to FIG. 10 and FIG. 20, the control scheme of the exhaust gas reduction control is described.

If the key switch is turned into the starting position while the select lever is staying at P-range, the engine temperature is judged in Step 1, and if the temperature is below the preset value, the reverse gear is engaged in Step 2 and the first clutch is engaged in Step 3. When the motor torque instruction part 14 generates the automobile starting torque instruction in Step 4, as the stator 39 of the electric motor 7 rotates the output shaft 37 of the first clutch, it rotates the engine through the first clutch 2. At this time, the reactive force developed at the rotor 40 of the electric motor 7 attempts to rotates the output shaft 38 of the second clutch in a direction opposite to the usual direction However, as the transmission is in the state of parking, there is no torque generated at the output shaft 6 due to this reactive force.

As the actual motor speed aNm detected at the electric motor control electronics 11 is supplied to the motor speed instruction part 17, if this motor speed is supplied as the motor speed instruction Nm to the electric motor control electronics 11 in Step 5, the motor speed increases little by little. In Step 6, the automobile starting control part 46 judges the motor speed, that is, the engine speed, and if it judges that whether the engine speed becomes the idling engine speed or higher, it issues the engine fuel injection and ignition instruction in Step 7, and then the engine starts.

The range is judged in Step 8 and the engine coolant temperature is judged in Step 9, and warming up operation is performed with the torque assistance by the electric motor in order to prevent the overload for the engine in Step 10 during the time while the range is P-range and the coolant temperature is below the preset value. If the select lever is selected to be other than P-range or the coolant temperature increases above the present value, this control is terminated, and then the reveres gear is released in Step 11 and the first clutch is released in Step 12, and finally the procedure is transferred to the control schemes as described in the embodiments 3 to 8.

According to the method of this embodiment, as fuel injection and air flow rate and ignition timing are optimized while reducing the engine load torque with the help of the torque generated by the electric motor, the injurious ingredient in the exhaust gas during the cold running can be minimized even if the lubrication oil viscosity is even high, for example, when the air temperature is extremely low.

[R-to-D or D-to-R Selection Control]

In case that the idling stop control is not performed in the conventional automobile, when the select lever is switched from N to D, or P or N to R during the automobile stops, the turbine speed of the torque converter becomes 0 temporarily, that is, in a stall state, which generates a selection shock. If the automobile moves in a direction opposite to the direction corresponding to the currently selected position and the selected lever is activated, there occurs such a large mechanical shock as called R-to-D or D-to-R selection shock.

According to the method of the embodiments 2 to 6 in the present invention, as the engine does not start when selecting the gear while the automobile parks, the automobile can start running smoothly by starting the creep running with the motor followed by the engine start.

Figure 21:
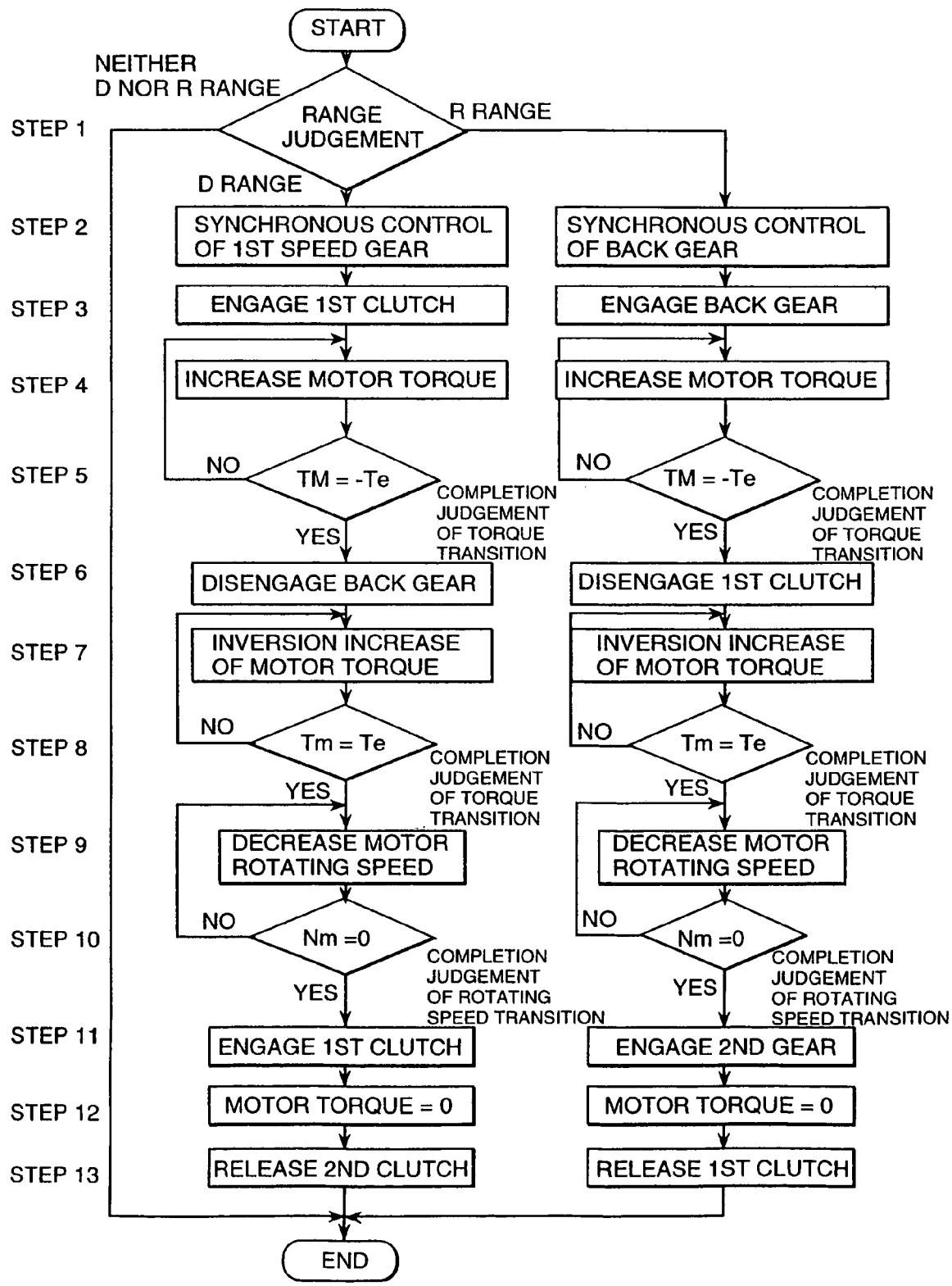
FIG. 21 is a flow chart illustrating the software configuration of the R-to-D or D-to-R selection control in the tenth embodiment of the present invention.
Figure 22:
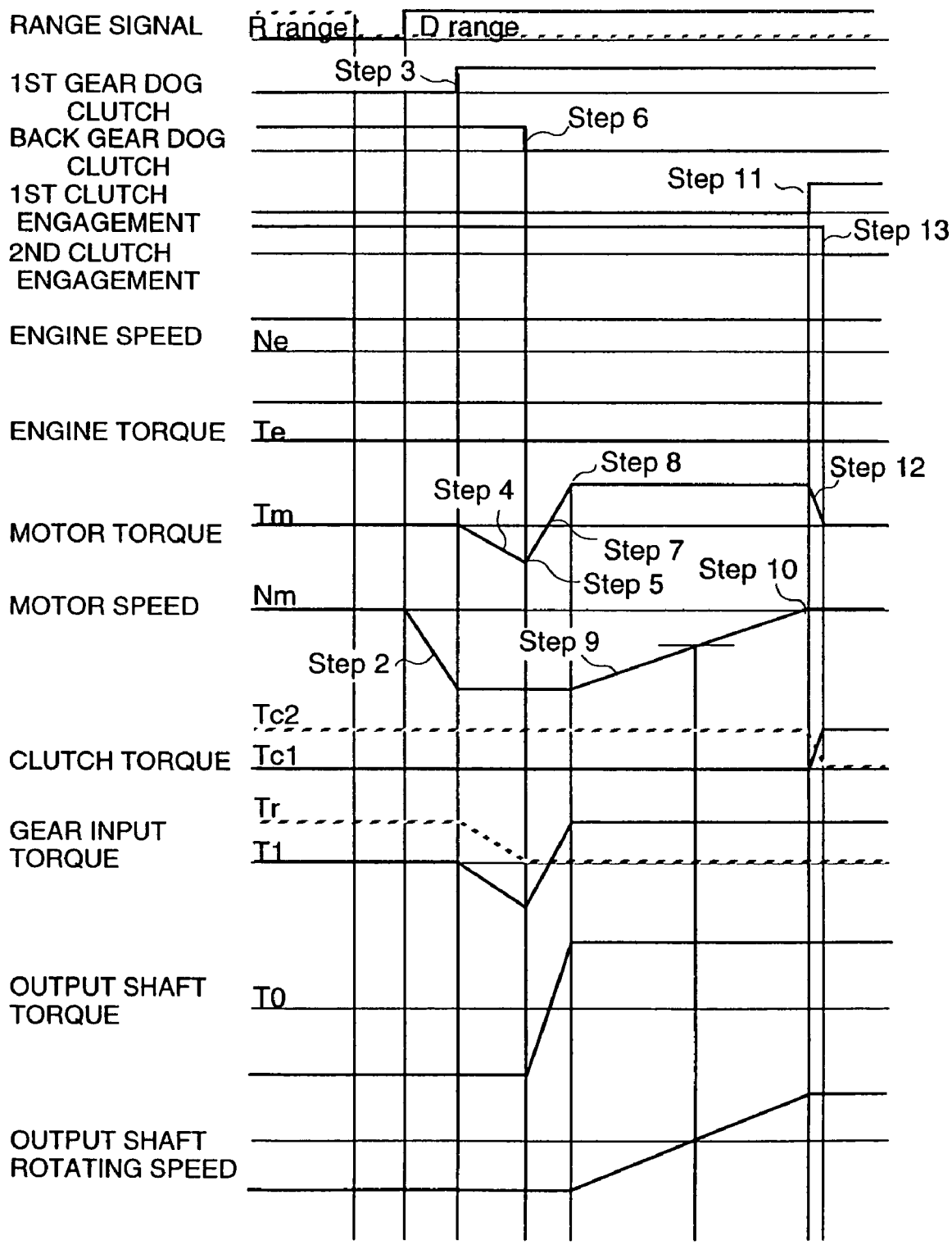
FIG. 22 is a time chart illustrating the changes in the torque and the rotating speed in the R-to-D or D-to-R selection control shown in FIG. 21

FIG. 21 is a flow chart of R-to-D or D-to-R selection control of the tenth embodiment of the present invention, and FIG. 22 shows a time chart of its individual waveform data. The transmission to be used is assumed to be as shown in FIG. 17. For example, suppose that R-to-D selection is performed while the automobile moves backward and then it continues to run in the forward direction. This way of running the automobile is such a familiar driving pattern that the automobile moves backward outside the garage and turns its direction, and that is called switch turn.

The process from the engine starting to the automobile starting while moving backward are described with the steps up to Step 11 of FIG. 18 in the embodiment 6. Assuming that the select lever is changed to D-range during the reverse running and with the acceleration pedal being pressed, the engine torque and the engine speed are supposed to be kept constant. The range is judged in Step 1 of FIG. 21, and if the range is D-range, the motor speed is adjusted in Step 2 so that the dog clutch of the first speed gear may be synchronized. The synchronous linking control shown by the flowchart in FIG. 6 for the embodiment 1 is applied to this step. The first speed gear is linked in Step 3, and the motor torque is made generate and increase in the backward direction with the first speed gear in Step 4. This step is used for transfer the torque from the reverse gear to the first speed gear. As the torque of the reverse gear becomes 0 at this step, the termination of the torque transfer is judged in Step 5 followed by the release of the reverse gear in Step 6. The judgment in Step 5 is based on the fact that the motor torque and the engine torque becomes identical to each other as shown in Step 2 of FIG. 8 in the embodiment 2, and thus, the equation Tm=−Te is used for this judgment.

When the motor torque is made reversed and increase in Step 7, the driving torque generates in the forward direction and thus the braking force is applied to the automobile running in a reverse direction. As the motor torque continues to increase until it becomes identical to the engine torque, the braking force, if too strong, may be reduced by releasing off the acceleration pedal. After the torque transfer is completed in Step 8, this state is equivalent to the state corresponding to the completion of the torque phase in the normal gear shifting operation. This state corresponds to the state when Step 3 of FIG. 8 is completed, and the rest part of the procedures are identical to the steps after Step 4 of FIG. 8. The motor speed is made reduce in Step 9, and after the completion of the motor speed transfer is judged in Step 10, the first clutch is engaged in Step 11 and the motor torque is made 0 in Step 12, and then the second clutch is released in Step 13. The difference from the normal gear shifting is that the rotation direction of the output shaft turns the other way round in the process. Assuming that the gear ratio of the first speed gear is almost the same as the gear ratio of the reverse gear, the motor rotates in the reverse direction with twice the engine speed immediately after completing the torque phase. When the negative motor speed becomes nearly equal to the engine speed during the motor speed is decreased in Step 9, the output speed becomes 0, which results in the action of the automobile from the reverse running to the forward running.

The case that the elect lever is moved into R-range during the forward running can be similarly processed as described in the right side of FIG. 21. This operation is called R-to-1 shift or 1-to-R shift.

[Planetary Gear Added Structure]

Figure 23:
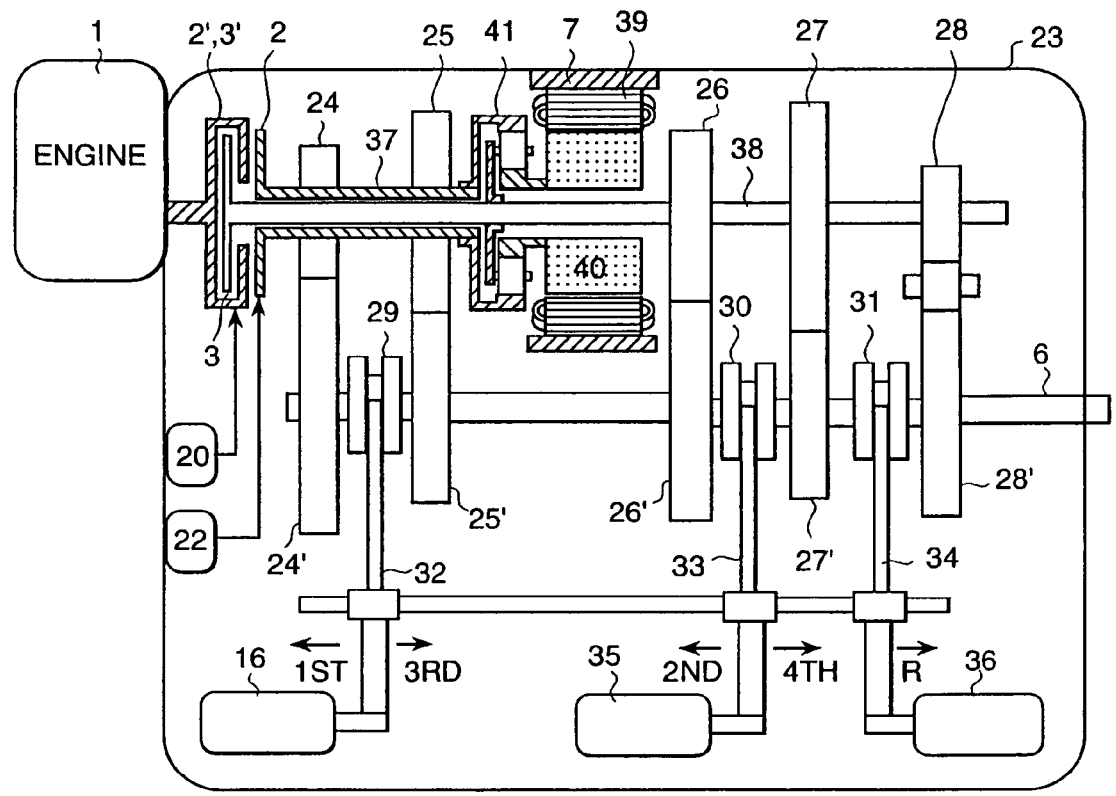
FIG. 23 is a structural drawing illustrating another embodiment of the transmission of the present invention.

FIG. 23 shows a transmission structure diagram illustrating the eleventh embodiment of the present invention. The difference from FIG. 4 and FIG. 1 is that a planetary gear 41 is connected between the output shafts 37 and 38 of both clutches, and the third shaft of the planetary gear 41 is connected to the rotor 40 of the electric motor 7. In the embodiment of FIG. 23, the ring gear of the planetary gear 41 is connected to the output shaft 37 of the first clutch, and the carrier of the planetary gear 41 is connected to the output shaft 38 of the second clutch, and the sun gear of the planetary gear 41 is connected to the rotor 40 of the electric motor 7. The stator 39 of the electric motor is fixed at the transmission housing 23.

Owing to this structure, as the stator 39 of the electric motor 7 does not rotate, the direct wiring can be used without slip ring for supplying the electric power, which leads to such an effect that the structure is simplified. In addition, in the embodiment of FIG. 4 and FIG. 17, the required electric motor torque Tm should satisfy the relation Tm=Te just before the termination of the torque phase, and specifically in this embodiment, as the electric motor output is reduced down by the planetary gear 41 and then applied to the both clutch shafts 37 and 38, the necessary electric motor torque Tm becomes smaller as defined below.

$$Tm = \{Zs/(Zs+Zr)\} Te \qquad \text{[Formula 10]}$$

where, Zs is the number of teeth of the sun gear of the planetary gear 41, and Zr is the number of teeth of the ring gear. Although the motor speed becomes higher than that in the case shown by FIG. 4 and FIG. 17, there may be such an effect that high speed and low torque motors contribute to the downsizing of the electric motor.

[Automobile Loading Example]

Figure 24:
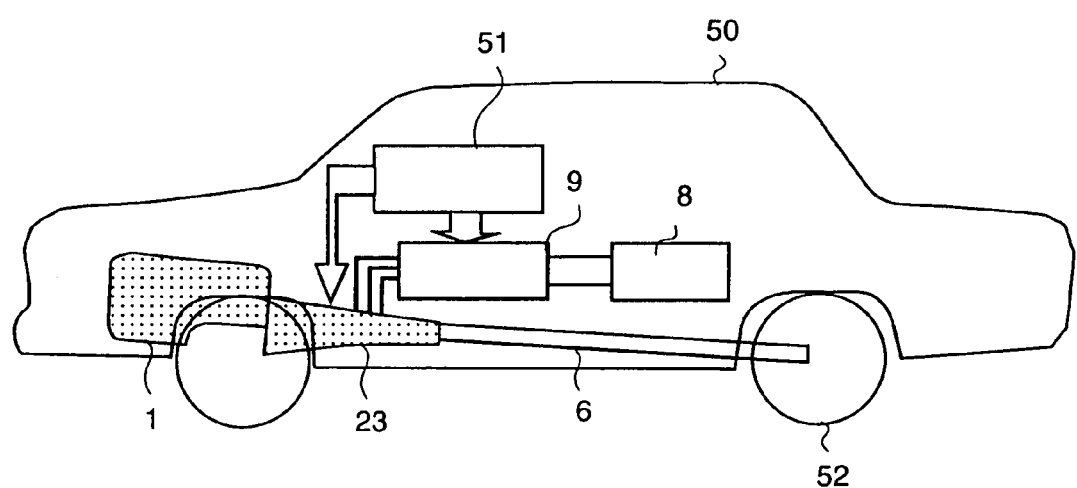
FIG. 24 is a conceptual drawing illustrating the structure of the automobile loading the transmission of the present invention.

FIG. 24 shows the twelfth embodiment in which the automatic transmission of the present invention is loaded on the automobile. The automatic transmission of the present invention, comprising the first clutch 2, the second clutch 3, the first gear train 4, the second gear train 5 and the electric motor 7, is constructed inside the transmission housing 23 connected to the engine 1 of the automobile 50. The output shaft 6 of the transmission is connected to the tire 52 through the differential gear (now shown). The inverter 9 is connected to the electric motor 7 of the transmission, and the battery 8 is loaded as the electric power to the inverter 9.

The instruction part 51 includes the motor torque instruction part 14 and the motor speed instruction part 17 for directing the torque and the rotating speed of the electric motor 7 through the electric motor control electronics 11, and directs the operations to the shift actuators 16, 35 and 36 and the clutch actuators 20 and 22.

According to the automobile in this embodiment, as the torque transfer and the motor speed transfer are performed during the transitional gear shifting operation by the electric motor control, the torque deviation due to the inertia torque in the inertia phase is fee and thus smooth gear shifting can be realized, and especially, the response for the acceleration torque for the shift-down operation is so fast that there is such an effect as the driving force characteristic can be extremely increased.

According to the method of the present invention, as the torque transfer is performed by the torque control of the electric motor for the creep mode, the automobile starting mode and the selecting mode as well as the transitional gear shifting mode, the clutch has enough abrasion resistance and has a long life as well as the automobile can be accelerated smoothly, and thus, there is such an effect that the drivability can be extremely improved.

In addition, as a single transmission can provide multiple functions, there is such an effect that the overall cost can be reduced relatively.

The invention claimed is:

1. An automatic transmission comprising:
   a first shaft selectively connected to or isolated from the output of an internal combustion engine by a first clutch;
   a second shaft selectively connected to or isolated from said output of said internal combustion engine by a second clutch;
   a first gear train provided on said first shaft;
   a second gear train provided on said second shaft;
   an output shaft selectively engaged with or released from a gear position in said first gear train by a transmission clutch, said output shaft being selectively engaged with or released from a gear position in said second gear train by said transmission clutch; and
   an electric motor connected to said first and second shafts so that the rotational speed of a shaft of said electric motor will be equal to the difference of rotational speeds between said first and second shafts.

2. A controlling apparatus for an automatic transmission, comprising:
   a first shaft selectively connected to or isolated from an output of an internal combustion engine by a first clutch;
   a second shaft selectively connected to or isolated from said output of said internal combustion engine by a second clutch;
   a first gear train provided on said first shaft;
   a second gear train provided on said second shaft;
   an output shaft selectively engaged with or released from a gear position in said first gear train by a transmission clutch, said output shaft being selectively engaged with or released from a gear position in said second gear train by said transmission clutch; and
   an electric motor connected to said first and second shafts,
   wherein, when a shifting command is given to said gear position in said second gear train under a state such that said first clutch is engaged, said second clutch is released, said gear position in said first gear train is engaged with said output shaft, said second gear train is released from said output shaft, and said output shaft is driven by said internal combustion engine,
   said gear position in said second gear train being engaged with said output shaft, said first gear train being released from said output shaft, said second clutch being engaged, and said first clutch being released.

3. The controlling apparatus for an automatic transmission of claim 2, wherein
   said second gear train and said output shaft are synchronized with each other in terms of rotational speed by varying the revolution of said second shaft by said electric motor to engage said gear position in said second gear train with said output shaft;
   the transfer torque on said gear position in said first gear train is reduced by increasing the torque on said second shaft by said electric motor;
   said first gear train is released from said output shaft when the transfer torque on said gear position in said first gear train reaches almost zero;
   rotational speeds of said first and second shafts are brought close each to the other by said electric motor maintaining the torque on said second shaft unchanged;
   said second clutch is engaged when rotational speeds of said first and second shafts reach almost equal; and
   said first clutch is released by bringing the torque generated by said electric motor to zero.

4. The controlling apparatus for an automatic transmission of claim 3, wherein the transfer torque on said gear position in said first gear train is judged to have reached almost zero when the output torque on said electric motor is approximately equal to the torque on said internal combustion engine.

* * * * *